United States Patent [19]

Boxall et al.

[11] Patent Number: 4,526,911

[45] Date of Patent: Jul. 2, 1985

[54] ALUMINUM CELL CATHODE COATING COMPOSITION

[75] Inventors: Larry G. Boxall; William M. Buchta; Arthur V. Cooke, all of Baltimore; Dennis C. Nagle, Catonsville; Douglas W. Townsend, Glen Burnie, all of Md.

[73] Assignee: Martin Marietta Aluminum Inc., Bethesda, Md.

[21] Appl. No.: 400,772

[22] Filed: Jul. 22, 1982

[51] Int. Cl.$^3$ .................. C08K 3/04; C08L 63/00
[52] U.S. Cl. .................... 523/445; 523/458; 523/468; 524/403; 524/404; 524/65; 524/66
[58] Field of Search ........... 524/404, 403, 65, 66; 252/506, 504, 507; 204/67; 523/445, 458, 468

[56] References Cited

U.S. PATENT DOCUMENTS

| | | | |
|---|---|---|---|
| 3,400,061 | 9/1968 | Lewis et al. | 204/67 |
| 3,429,759 | 2/1969 | Kellar et al. | 156/155 |
| 3,492,208 | 1/1970 | Seager | 204/67 |
| 3,616,045 | 10/1971 | Kozar et al. | 156/326 |
| 3,657,592 | 4/1972 | Kellar | 313/357 |
| 3,661,736 | 5/1972 | Holliday | 204/67 |
| 3,932,244 | 1/1976 | Mikkelsen | 524/66 |
| 4,308,114 | 12/1981 | Das et al. | 204/67 |
| 4,376,029 | 3/1983 | Joo et al. | 252/507 |
| 4,377,463 | 3/1983 | Joo' et al. | 204/294 |
| 4,439,382 | 3/1984 | Joo' et al. | 264/29.5 |
| 4,465,581 | 8/1984 | Juel et al. | 204/290 R |

Primary Examiner—Lewis T. Jacobs
Attorney, Agent, or Firm—Herbert W. Mylius

[57] ABSTRACT

This invention relates to an improved coating composition for application to aluminum cell cathodes, wherein said composition comprises a Refractory Hard Material, and a thermosetting resinous binder system.

The resinous binder system is characterized by a char yield greater than 25 percent, while the coating composition exhibits expansion characteristics such as to adhere to a cathode block at temperatures up to and including those normally encountered in the operation of an aluminum cell. The ablation rate of the carbon system utilized is essentially equal to the combined wear and dissolution rate of the Refractory Hard Material in an aluminum cell environment.

31 Claims, No Drawings

ALUMINUM CELL CATHODE COATING COMPOSITION

BACKGROUND OF THE INVENTION

The manufacture of aluminum is conducted conventionally by the Hall-Heroult electrolytic reduction process, whereby aluminum oxide is dissolved in molten cryolite and electrolized at temperatures of from 900° C. to 1000° C. This process is conducted in a reduction cell typically comprising a steel shell provided with an insulating lining of suitable refractory material, which is in turn provided with a lining of carbon which contacts the molten constituents. One or more anodes, typically made of carbon, are connected to the positive pole of a direct current source, and suspended within the cell. One or more conductor bars connected to the negative pole of the direct current source are embedded in the carbon cathode substrate comprising the the floor of the cell, thus causing the cathode substrate to become cathodic upon application of current. If the cathode substrate comprises a carbon lining it typically is constructed from an array of prebaked cathode blocks, rammed together with a mixture typically of anthracite, coke, and coal tar pitch.

In this conventional design of the Hall-Heroult cell, the molten aluminum pool or pad formed during electrolysis itself acts as part of the cathode system. The life span of the carbon lining or cathode material may average three to eight years, but may be shorter under adverse conditions. The deterioration of the carbon lining material is due to erosion and penetration of electrolyte and liquid aluminum as well as intercalation by metallic sodium, which causes swelling and deformation of the carbon blocks and ramming mix.

Difficulties in cell operation have included surface effects on the carbon cathode beneath the aluminum pool, such as the accumulation of undissolved material (sludge or muck) which forms insulating regions on the cell bottom. Penetration of cryolite through the carbon body causes heaving of the cathode blocks. Aluminum penetration to the iron cathode bars results in excessive iron content in the aluminum metal, or in more serious cases a tap-out. Another serious drawback of the carbon cathode is its non-wetting by aluminum, necessitating the maintenance of a substantial height of pool or pad of metal in order to ensure an effective molten aluminum contact over the cathode surface. One problem of maintaining such an aluminum pool is that electromagnetic forces create movements and standing waves in the molten aluminum. To avoid shorting between the metal and the anode, the anode-to-cathode distance (ACD) must be kept at a safe 4 to 6 cms in most designs. For any given cell installation there is a minimum ACD below which there is a serious loss of current efficiency, due to shorting of the metal (aluminum) pad to the anode, resulting from instability of the metal pad, combined with increased back reaction under highly stirred conditions. The electrical resistance of the inter-electrode distance traversed by the current through the electrolyte causes a voltage drop in the range of 1.4 to 2.7 volts, which represents from 30 to 60 percent of the voltage drop in a cell, and is the largest single voltage drop in a given cell.

To reduce ACD and associated voltage drop, extensive research using Refractory Hard Materials (RHM), such as $TiB_2$, as cathode materials has been carried out since the 1950's. $TiB_2$ is only very slightly soluble in aluminum, is highly conductive, and is wetted by aluminum. This property of wettability allows an aluminum film to be electrolytically deposited directly on an RHM cathode surface, and avoids the necessity for an aluminum pad. Because titanium diboride and similar Refractory Hard Materials are wetted by aluminum, resist the corrosive environment of a reduction cell, and are excellent electrical conductors, numerous cell designs utilizing Refractory Hard Materials have been proposed in an attempt to save energy, in part by reducing anode-to-cathode distance.

The use of titanium diboride current-conducting elements in electrolytic cells for the production or refining of aluminum is described in the following exemplary U.S. Pat. Nos. 2,915,442, 3,028,324, 3,215,615, 3,314,876, 3,330,756, 3,156,639, 3,274,093, and 3,400,061. Despite the rather extensive effort expended in the past, as indicated by these and other patents, and the potential advantages of the use of titanium diboride as a current-conducting element, such compositions do not appear to have been commercially adopted on any significant scale by the aluminum industry. Lack of acceptance of $TiB_2$ or RHM current-conducting elements of the prior art is related to their lack of stability in service in electrolytic reduction cells. It has been reported that such current-conducting elements fail after relatively short periods in service. Such failure has been associated with the penetration of the self-bonded RHM structure by the electrolyte, and/or aluminum, thereby causing critical weakening with consequent cracking and failure. It is well known that liquid phases penetrating the grain boundaries of solids can have undesirable effects. For example, RHM tiles wherein oxygen impurities tend to segregate along grain boundaries are susceptible to rapid attack by aluminum metal and/or cryolite bath. Prior art techniques to combat $TiB_2$ tile disintegration in aluminum cells have been to use highly refined $TiB_2$ powder to make the tile, containing less than 50 ppm oxygen at 3 or 4 times the cost of commercially pure $TiB_2$ powder containing about 3000 ppm oxygen. Moreover, fabrication further increases the cost of such tiles substantially. However, no cell utilizing $TiB_2$ tiles is known to have operated successfully for extended periods without loss of adhesion of the tiles to the cathode, or disintegration of the tiles. Other reasons proposed for failure of RHM tiles and coatings have been the solubility of the composition in molten aluminum or molten flux, or the lack of mechanical strength and resistance to thermal shock. Additionally, different types of $TiB_2$ coating materials, applied to carbon substrates, have failed due to differential thermal expansion between the titanium diboride material and the carbon cathode block. To our knowledge no prior RHM-containing materials have been successfully operated as a commercially employed cathode substrate because of thermal expansion mismatch, bonding problems, etc.

For example, U.S. Pat. No. 3,400,061, of Lewis et al, assigned to Kaiser Aluminum, teaches a cell construction with a drained and wetted cathode, wherein the Refractory Hard Material cathode surface consists of a mixture of Refractory Hard Material, at least 5 percent carbon, and generally 10 to 20% by weight pitch binder, baked at 900° C. or more. According to the patent, such a composite cathode has a higher degree of dimensional stability than previously available. The composite cathode coating material of this reference may be rammed into place in the cell bottom. This technique has not been widely adopted, however, due to susceptibility to attack by the electrolytic bath, as taught by a later Kaiser Aluminum U.S. Pat. No. 4,093,524 of Payne.

Said U.S. Pat. No. 4,093,524, of Payne, claims an improved method of bonding titanium diboride, and other Refractory Hard Materials, to a conductive substrate such as graphite, or to silicon carbide. The cathode surface is made from titanium diboride tiles, 0.3 to 2.5 cm thick. However, the large differences in thermal expansion coefficients between such Refractory Hard Material tiles and carbon precludes the formation of a bond which will be effective both at room temperature and at operating temperatures of the cell. The bonding is accordingly formed in-situ at the interface between the Refractory Hard Material tile and the carbon by a reaction between aluminum and carbon to form aluminum carbide near the cell operating temperature. However, since the bond is not formed until high temperatures are reached, tiles are easily displaced during startup procedures. The bonding is accelerated by passing electrical current across the surface, resulting in a very thin aluminum carbide bond. However, aluminum and/or electrolyte attack upon the bond results if the tiles are installed too far apart, and if the plates are installed too close together, they bulge at operating temperature, resulting in rapid deterioration of the cell lining and in disturbance of cell operations. Accordingly, this concept has not been extensively utilized.

Holliday, in U.S. Pat. No. 3,661,736, claims a cheap and dimensionally stable composite cathode for a drained and wetted cell, comprising particles or chunks of arc-melted "RHM alloy" embedded in an electrically conductive matrix. The matrix consists of carbon or graphite and a powdered filler such as aluminum carbide, titanium carbide or titanium nitride. However, in operation of such a cell, electrolyte and/or aluminum attack grain boundaries in the chunks of arc-melted Refractory Hard Material alloy, as well as the large areas of carbon or graphite matrix, at the rate of about one centimeter per annum, leading to early destruction of the cathodic surface.

U.S. Pat. No. 4,308,114, of Das et al, discloses a cathode surface comprised of Refractory Hard Material in a graphitic matrix. In this case, the Refractory Hard Material is composited with a pitch binder, and subjected to graphitization at 2350° C., or above. Such cathodes are subject to early failure due to rapid ablation, and possible intercalation and erosion of the graphite matrix.

In addition to the above patents, a number of other references relate to the use of titanium diboride in tile form. Titanium diboride tiles of high purity and density have been tested, but they generally exhibit poor thermal shock resistance and are difficult to bond to carbon substrates employed in conventional cells. Mechanisms of de-bonding are believed to involve high stresses generated by the thermal expansion mismatch between the titanium diboride and carbon, as well as aluminum penetration along the interface between the tiles and the adhesive holding the tiles in place, due to wetting of the bottom surface of the tile by aluminum. In addition to debonding, disintegration of even high purity tiles may occur due to aluminum penetration of grain boundaries. These problems, coupled with the high cost of the titanium diboride tiles, have discouraged extensive commercial use of titanium diboride in conventional electrolytic cells, and limited its use in new cell design. It is a purpose of the present invention to overcome the deficiencies of past attempts to utilize Refractory Hard Materials as a surface coating for carbon cathode blocks, and for monolithic cathode surfaces.

SUMMARY OF THE INVENTION

The present invention relates to the use of a carbon-Refractory Hard Material coating composition, containing Refractory Hard Material, a thermosetting binder system, carbonaceous filler and additive, and modifying agents, which may be applied to a carbon cathode and may be cured in-situ to a hard, tough surface comprising RHM in a carbonized binder matrix. The carbonaceous additive utilized in the composition of this invention may include carbon fibers, which act as crack arrestors and strengtheners. Sufficient RHM is incorporated in the coating material to ensure continuous aluminum wetting of the surface. Thus, the coating provides an economic and effective application of the advantages of RHM in cathodes, while eliminating the need for more costly RHM tiles.

DESCRIPTION OF THE PREFERRED EMBODIMENTS

According to the present invention, it has been found that cathode structures may be coated with Refractory Hard Material (RHM) combined with specified thermoset bonding agents and other materials to improve the conventional carbon lining of an aluminum reduction cell. Such coated cathodes combine the advantages of conventional carbon linings, such as structural integrity and low cost, with desired properties attained by use of the Refractory Hard Materials. Such improvements include wettability by molten aluminum, low solubility in the molten aluminum-cryolite environment, good electrical conductivity, and decreased muck adhesion. In addition, the present invention is applicable to existing reduction cells without the cost and time of a complete cell redesign, or the high cost of producing RHM tiles or RHM alloy tiles suggested by the prior art. The coating of the present invention may also be used in cell designs which utilize sloped cathodes.

In understanding the concept of the present invention, it is important that certain distinctions and definitions be observed. Accordingly, the following definitions shall be applied with respect to this invention.

The "coating composition" of the present invention is comprised of Refractory Hard Material, carbonaceous additive, carbonaceous filler, and binder system. As used herein, the terms "coating composition" or "coating material" shall be intended to encompass the combination of all of these materials. The term "coating", on the other hand, may comprise less, depending on state of drying, cure, or carbonization, since for example, mix liquid may be evaporated, and/or polymerized, during cure and carbonization.

The "Refractory Hard Materials" are in general defined as the borides, carbides, silicides, and nitrides of the transition metals in the fourth to sixth group of the periodic system, often referred to as Refractory Hard Metals, and alloys thereof.

"Resinous binder" shall be used to designate a polymerizable and/or cross-linkable thermosetting carbonaceous substance.

The "mix liquid" of the present invention functions in a variety of manners in the coating composition of the present invention, depending upon specific composition. It may be present to allow easy and uniform mixing of the solid components of the coating composition and to provide an easily spreadable mass. Certain mix liquids, such as furfural, may also permit an increase in the amount of carbonaceous filler which may be incorporated in the coating composition. The mix liquid may also enhance internal bonding and bonding between the coating and the carbon substrate, when it is a solvent containing the resinous binder, and/or constitutes the resinous binder or part of the resinous binder. This is because a dissolved resin or liquid resin may more easily penetrate and impregnate permeable constituents of the coating, as well as the carbon substrate. The mix liquid also permits wicking of the resin into interstitial voids between particles of the coating composition by capillary action. The mix liquid may act solely as a solvent for the resinous binder (already present in the solids portion of the binder system), such as methyl ethyl ketone (which could dissolve a novolac if present in the solids), and be evaporated during cure and carbonization operations. If, on the other hand, the mix liquid is present simply as an inert carrier liquid, then it too may be evaporated during cure and carbonization. Otherwise, the mix liquid may function as a combined solvent and resin former, such as furfuryl alcohol and furfural, part of which volatilizes during heating while the remainder become incorporated into the resinous binder. In another instance, the mix liquid may be the resinous binder per se, such as where the resinous binder is a liquid such as furfural (generally in combination with phenol), furfuryl alcohol, or low polymers of these, or a resole. The mix liquid may also comprises the resinous binder in the case of a solid resin, such as a novolac, dissolved in a solvent (the solvent portion of which may volatilize during heat up), or a high viscosity resin such as a partially polymerized resole thinned by a solvent. The mix liquid may also contain gas release agents, modifying agents, and curing agents.

"Binder system" shall be used to indicate resinous binder, mix liquid, and, if required, gas release agents, modifying agents, and curing agents.

"Gas release agent" shall be taken to mean agents present which form liquid phases which seep through the coating and then evaporate, to create small channels within the coating to permit release of volatiles.

"Modifying agents" shall be taken to mean materials added to the resinous binder to modify, for example, curing, electrical properties, or physical properties such as flexural strength or impact strength prior to carbonization of the coating.

"Curing agents" shall be taken to mean agents required to either copolymerize with the resin or to activate the resin to a state in which the resin may polymerize or copolymerize. Cross-linking or activating agents fall into this category, as do catalysts required for most polymerization and cross-linking reactions.

"Carbonaceous filler" shall be interpreted to mean those carbonaceous materials present, either as a component of a known carbon cement or as part of a proprietary or custom carbon system, having a C:H ratio greater than 2:1, which are −100 mesh in size. While a carbonaceous filler may have reactive groups present, and need not be fully carbonized, such materials do not polymerize with themselves as the resinous binder material does. Further, carbonaceous filler is essentially insoluble in commonly used solvents such as methyl ethyl ketone or quinoline, while the resinous binder (in its incompletely cured state) is usually soluble therein.

"Carbonaceous additives" shall be those carbonaceous materials present, either as a component of a known carbon cement or as part of a proprietary or custom carbon system, having a C:H ratio greater than 2:1, which comprise particulate carbon aggregate having a particle size range between −4 mesh and +100 mesh, and/or carbon fibers.

The term "carbon system" shall encompass binder system plus carbonaceous additive and carbonaceous filler; or, coating composition minus RHM.

"Carbon cement" shall be taken to mean a commercially available carbonaceous cement or adhesive, generally comprising a resinous binder, mix liquid, carbonaceous filler, and curing agents, the solid and liquid portions of which may be packaged separately to increase shelf life, or as a premixed cement. Gas release agents, and/or modifying agents may be present in such systems, or may be added thereto for use in the present invention. Carbonaceous additives are generally added to such systems for use in the present invention if not present in the commercially available formulation.

Pitch may be present as part of the resinous binder, as a modifying material, but requires the presence of a suitable curing agent, such as hexamethylenetetramine. Such a curing agent may be already present as a component of the resinous binder, or may be added thereto to facilitate cross-linkage between the resinous binder and the pitch, or linkage between the pitch and carbonaceous filler, or self-linkage between the polynuclear aromatics which comprise the bulk of pitch. Although pitch is known to constitute a graphite precursor, graphitization is not realized in the present invention. Thus, the graphite precursor is dispersed within the resinous binder, which is an amorphous carbon precursor. Pitch may seep through the coating to provide gas release channels, and may, in the presence of appropriate curing agents, cross link with the resinous binder and/or the carbonaceous filler.

The coating material of the present invention is so constituted to achieve a number of critical objectives. First, the coating composition can yield to accomodate shrinkage and expansion differences, so that the coating adheres tenaciously to the cathode substrate over temperatures up to about 800° C., at which temperature a slowly heated coating composition has been fully cured and carbonized to a rigid mass. It then has a thermal expansion coefficient thereafter very similar to that of the substrate to which it is applied. Further, the carbon content, and type of resinous binder, of the coating material are such that a high total char formation occurs during carbonization. This minimizes formation of large closed voids and excessive gas evolution. Also, the carbon matrix of the carbonized coating has an ablation rate in service equal to or very slightly greater than the combined rate of wear and dissolution of the Refractory Hard Material in an aluminum cell environment, thus assuring even wear of the coating surface, and continual exposure of Refractory Hard Material at the surface. "Ablation" is defined herein to encompass the loss and consequent thinning of a material through a combination of mechanical and chemical mechanisms. Purely graphitic structures fail in this respect, due to considerably faster loss rates of the anisotropic structure of the graphitic matrix, caused by sodium intercalation, for example, and the weak bonds between atomic layers of graphitic material. To achieve these critical objectives, it has been discovered that it is necessary to provide a carbon matrix having very specific characteristics, such that the carbon matrix of the present invention provides a high degree of strength in three dimensions, as opposed to having the planar weakness present in graphite.

First, to achieve an adherent coating over the entire temperature range to which the coated cathode block may be subjected, it is critical that the coating material exhibit a reasonable degree of dimensional yield over the temperature range from ambient to about 800° C., in which range the coating releases volatiles, and undergoes curing and carbonization to a solid, rigid mass. In this temperature range, the coating composition may be subject to "thinning" or compression, a vertical thickness change, to accommodate volumetric contraction or shrinkage of the coating, vis-a-vis the positive linear expansion of the block to which it is applied. It is noted that the resinous binder, per se, undergoes considerable expansion and contraction over this temperature range, and that the presence of carbon fiber is most effective in strengthening the coating during this stage of cure and carbonization, by minimizing harmful cracking and permitting fine cracking, which permits stress relief and helps accommodate expansion differentials between the coating and the substrate. However, once the coating composition has been carbonized to a rigid, hard solid, it is critical that the thermal expansion coefficient of the coating be essentially equal to the thermal expansion coefficient of the cathode substrate. Thus, the value of the percentage of expansion of the carbonized coating must be within about ±0.2 of the value of percentage of expansion of the cathode substrate, and preferably within about +0.1 over the temperature range of from about 800° C. to about 1000° C., for example. Thus, if the cathode substrate to be coated exhibits an expansion of +0.15 percent over the temperature range from about 800° C. to about 1000° C., or higher, the coating should exhibit an expansion (over the same range) of from −0.05 to +0.35 percent, and preferably from +0.05 to +0.25 percent.

It is desirable that the amount of shrinkage that the cured binder system undergoes during carbonization be as small as possible. This may be accomplished by selection of a carbonaceous resin which when utilized in accordance with the present invention will provide a coating composition which when subjected to carbonization exhibits a shrinkage of the coating on the substrate less than that which would induce coating failure, cathode block failure, or separation of coating from the cathode substrate. Fine vertical cracking within the carbonized coating is an acceptable stress relief mechanism. The presence of carbonaceous additive and/or filler is beneficial.

Both shrinkage and expansion of the cured binder system and the coating composition may be measured in the following fashion. A sample of the composition to be tested is prepared and spread in a Teflon ® coated mold having dimensions 5 cm × 1.27 cm × 0.64 cm deep. The composition is cured, and allowed to cool before removal from the mold. The piece is then cut into four test samples 2.54 cm × 0.64 cm × 0.64 cm, which are then dried to constant weight at 250° C. in an alumina crucible. A test sample is measured utilizing a micrometer, then heated from room temperature to 1000° C. in a dilatometer which is continuously flushed with argon. The expansion/contraction is recorded continuously as a function of temperature on a chart recorder. Two expansion/shrinkage values are calculated: One based on original sample length and final length at 1000° C.; the other based upon original sample length and final length after return to room temperature (this is termed "overall contraction"). Samples are also measured with the micrometer after cooling, as a check on the chart recorder. It is desired that the full cycle or overall contraction be preferably less than about 1.0 percent.

In addition to the above considerations, it has been found critical to utilize a binder system which, when subjected to carbonization, has a char yield of greater than about 25 percent. Char yield is defined herein as the mass of stable carbonaceous residue formed by the thermal decomposition of unit mass of the binder system. Thermogravimetric analyses of various binder systems have demonstrated that the amount of char yield is a function of the aromaticity of the resin structure. In general, carbon rings that are bonded at two or more sites will usually remain as char. Ladder polymers are the most stable, losing only hydrogen, and giving a very high carbon char yield.

Char yield of a binder system, as utilized herein, is determined by curing a proposed carbon system (i.e. binder system plus carbonaceous filler) for a 24 hour period so as to achieve polymerization and/or cross-linkage, followed by heating at 250° C. for sufficient time to achieve constant weight, so as to eliminate volatiles, polymerization products, and/or unreacted liquid. The sample is then sintered to 1000° C. in a non-oxidizing atmosphere, and the remaining char weight determined. Similarly, the char weight of carbonaceous filler present in the carbon system is determined, and subtracted from the char weight of the carbon system to determine the char weight of the binder system. From the weight of the carbon system at 250° C., and the known weight of carbonaceous filler at 250° C., one may calculate the weight of the binder system at 250° C. The char yield of the binder system is then calculated, as a percentage, from the char weight of the binder system and the weight of the binder system at 250° C. It has been observed that binder systems exhibiting a char yield of greater than about 25% give acceptable coatings upon cure and carbonization, while a binder system exhibiting 8% char yield gave an unacceptable carbon matrix upon carbonization. Char yields in excess of 50% are preferred.

To achieve a long-lasting coating composition in the environment of an aluminum cell, it is desired that the rate of ablation of the cured and carbonized carbon system be close to that of the Refractory Hard Material in such environment. As the Refractory Hard Material is removed from the coating, the carbon matrix thereof is removed at a similar or very slightly faster rate, thus exposing additional Refractory Hard Material to the cell environment. In this manner, the coated cathode surface remains essentially constant, in terms of Refractory Hard Material content, thus improving cell operation as measured by uniformity of performance. In previous attempts to provide Refractory Hard Material coated cathodes, ablation and/or intergranular attack have resulted in rapid surface deterioration due to depletion of either the Refractory Hard Material or the carbon matrix at a rate greater than the other, resulting in periods when there are localized areas having either a Refractory Hard Material-rich surface composition with insufficient binding capability, or a carbon-rich surface with insufficient Refractory Hard Material. The present invention overcomes these failures by providing a coating in which Refractory Hard Material and carbon matrix are dissolved or otherwise depleted at approximately equal rates.

It is important to clarify or distinguish between carbonization and graphitizing as they apply to heating carbonaceous bodies in the context of the present invention. "Carbonizing" is normally done by heating a carbonaceous body, either in unitary or particulate form, for the purpose of driving off volatiles, and progressively increasing the ratio of carbon to hydrogen, and to progressively eliminate hydrogen from the body. In the carbonizing process, temperature is gradually increased to allow for the slow evolution of volatiles such as decomposition products so as to avoid blister formation, and to permit volumetric shrinkage (which will occur at some point in the operation) to proceed gradually, so as to avoid formation of large cracks. While curing is considered to take place at temperatures up to about 250° C., carbonization temperatures normally range from about 250° C. to about 1000° C., although higher temperatures up to 1600° C. or higher also can be employed. While carbonization may be continued to about 1000° C., or higher, the carbonization of the carbonaceous materials present is essentially complete at about 800° C., and the resinous binder has been carbonized to bind the filler materials and RHM into a durable structure. The initial curing and initial stage of the carbonization operation are normally carried out in a conventional radiant or convection-type furnace heated by gas or oil, with the heat input to the carbon being by indirect heat transfer, or direct flame contact. At some point, e.g. above about 250° C., the carbon body becomes sufficiently electrically conductive to permit resistive heating, if desired.

It is to be noted that in the present invention, the coating material is preferably in the form of a workable paste, which is trowelled or smoothed to a desired thickness and surface smoothness. This coating is cured, by polymerizing and/or cross-linking, and losing volatiles, by slowly heating to about 250° C., at which point the coating has reached the thermoset stage and formed a relatively solid mass. Carbonizing, at temperatures above 250° C., then converts this coating to a rigid matrix consisting essentially of non-graphitized carbon with RHM, carbonaceous additive, and carbonaceous filler therein.

A distinction is to be drawn between this process and prior art processes employing only pitch binders, in the absence of cross-linking or polymerizing agents. By itself, pitch does not cross-link, or polymerize, but in fact passes through a liquid "plastic" state or zone between about 50° C. and about 500° C., in which temperature range substantial swelling occurs, succeeded by a period when the carbonaceous mass congeals (and contracts) into a hard solid coke body. The coating composition of the present invention, on the other hand, commences polymerization and/or cross-linking at temperatures which may be as low as about 20° C., and is cured to a relatively hard resin state by temperatures below about 250° C., dependent upon cure time and coating thickness, followed by progressive hardening through carbonization.

The entire heating cycle in carbonization is somewhat time consuming. Carbonizing typically results in loss of volatiles, and elimination of volatile reaction products of thermal decomposition. However, there is no significant change in the crystallographic structure of the carbonaceous additive or filler, and the carbonized resin continues to appear as amorphous, even though it may bond together a substantial quantity of graphitic material or material containing graphitic crystallites.

Graphitization is readily distinguished from carbonizing or carbonization, as described, in that it requires considerably higher temperatures and longer time periods, and produces drastic and easily observed changes in the atomic structure. In graphitizing, the temperatures employed range from a little over about 2000° C. up to 3000° C., with the more typical temperatures ranging from about 2400° C. or 2500° C. to 3000° C., as these temperatures are usually associated with the higher quality grades of graphite. This heating occurs over a rather extensive time period, typically about two weeks. The heating is done in a non-oxidizing atmosphere, typically by passing electric current directly through the carbon so as to heat the carbon internally and directly by its own electrical resistance, as opposed to the more conventional furnace and heating means employed in carbonizing. Graphitizing drastically alters and rearranges an amorphous or partially graphitic internal structure, by developing a graphite crystal atomic arrangement. A graphite structure exhibits the well-known close packed, layered, and specifically oriented graphitic structural arrangement. Generally, graphitization is only practicable with the well known graphite precursor substances such as pitch.

To illustrate some of the differences in internal structure in comparing graphite with non-graphitic or amorphous carbon, the $d_{002}$ and $L_c$ dimensions are useful. The "$L_c$" dimension applies to the crystal or crystallite size in the "c" direction, the direction normal to the basal plane, and the "$d_{002}$" dimension is the interlayer spacing. These dimensions are normally determined by x-ray diffraction techniques. R. E. Franklin defines amorphous carbon as having an interlayer spacing ($d_{002}$) of 3.44 Å and crystalline graphite of 3.35 Å. (Acta Crystallographica, Vol. 3, p. 107 (1950); Proceedings of the Royal Society of London, Vol. A209, p. 196 (1951); Acta Crystallographica, Vol. 4, p. 253 (1951).) During the process of graphitization, the amorphous structure of graphite precursor carbons is changed to the crystalline structure of graphite which is shown by an increase in the $L_c$ dimension and a decrease in the $d_{002}$ dimension. In amorphous carbon, the $L_c$ dimension normally ranges from about 10 to about 100 Angstrom units (Å), whereas most graphite typically exhibits an $L_c$ dimension of greater than about 350 or 400 Å, typically from over 400 Å to about 1000 Å. There is another subtantially graphitic structure wherein $L_c$ is between about 100 Å or more up to about 350 or 400 Å, and this is sometimes referred to as "semi-graphitic", having the same general atomic arrangement and configuration in its structure as graphite just described but differing soae from the more common x-ray diffraction pattern for graphite due to a slight difference of orientation of successive atomic planes. Both graphite structures have a $d_{002}$ dimension less than about 3.4 Å. In general, graphitizing at temperatures from about 2000° C. up to about 2400° C. tends to produce the "semi-graphitic" structure whereas temperatures over 2400° C. tend to produce the "normal" graphite structure.

One acceptable practice in producing carbonaceous coatings according to the present invention is to employ particulate graphite as a filler material which is added to the binder and other components. The mixture is then spread, cured, and carbonized. While this carbonized carbonaceous material may contain some graphite, it is not bonded by the graphite, but rather contains both graphite particles from the filler and amorphous carbon derived from the binder and/or components of the carbonaceous filler. In practicing the present invention it is important that the carbonized cathode coating be constituted of a non-graphitizing binder so as to assure the proper combination of electrical and thermal conductivity, coefficient of expansion, ablation rate, and stability properties in the carbon-Refractory Hard Metal surface.

While the borides, carbides, silicides and nitrides of elements in Groups IV to VI of the Periodic Table generally all possess high melting points and hardness, good electronic and thermal conductivity, are wetted by molten aluminum, and are resistant to aluminum and alumina-cryolite melts, $TiB_2$ is the preferred RHM due to its relatively low cost and high resistance to oxy-fluoride melts and molten aluminum. Suitably, Refractory Hard Material particle sizes may range from submicron to about 10 mesh, and preferably from submicron to about −100 mesh, and most preferably about −325 mesh.

It is generally thought that grain boundaries between ($TiB_2$ or other Refractory Hard Material) crystals are sensitized, i.e., are made susceptible to attack by the segregation of oxide impurities. Migration of oxygen dissolved in individual crystals of $TiB_2$ to crystal boundaries is also thought to be possible by diffusional processes at the temperatures at which aluminum cells normally run, i.e., around 1000° C. Thus, oxygen impurities, whether or not originally segregated at the surface of $TiB_2$ crystals, can migrate to the inter-crystalline boundaries and make them susceptible to attack. Attack of the entire area of the intercrystalline boundaries results in loss of $TiB_2$ crystals.

It has now been shown that single crystals of $TiB_2$, bicrystals of $TiB_2$, open clusters of crystals of $TiB_2$, and/or crushed and ground crystals of $TiB_2$, when in intimate contact with the carbon matrix do not crack or disintegrate, when exposed to bath and molten aluminum in aluminum cells for long periods of time. All of these shall be included within the term "single crystals" as employed herein. It is also to be understood that while discussion focuses on $TiB_2$, other RHM materials are also intended. The common feature of all of these particles is that they generally have more exposed free crystal surfaces or transcrystalline fractures than internal grain boundaries between two or more crystals. The binder system is thus able to adhere to almost every $TiB_2$ crystal, through bonding to crystal facets or broken surfaces. The open clusters of smaller $TiB_2$ crystals can be penetrated by the carbonaceous binder system, so that even if the grain boundaries between $TiB_2$ crystals should be attacked by the bath, the $TiB_2$ crystals will still be held within the coating by the binder. This has been observed in broken pieces of the carbonized coating. $TiB_2$ tends to break in a conchoidal (or glasslike) ranner so that broken pieces have surfaces that cut across crystal planes, and the binder system forms strong bonds to such surfaces.

Both the carbon and $TiB_2$ components of surfaces made in accordance with this invention appear to slowly dissolve, or erode, so that new $TiB_2$ crystals are continuously exposed to the molten aluminum. Both $TiB_2$ and carbon dissolve through various chemical mechanisms in the aluminum metal in the cell up to saturation concentrations. However, they may be present beyond the saturation limit as undissolved particles of the elements, or in compounds containing the elements. The rate at which both $TiB_2$ and carbon are lost from the cathode surface is dependent on such factors as temperature, motion of the metal, bath, and muck, and overall bath chemistry. It is believed that some of the $TiB_2$ particles are carried away into the aluminum before being completely dissolved. The $TiB_2$ concentration in the aluminum metal typically is found to be only slightly above the solubility limit for the temperature at which the cell is operated. The rate of carbon loss is a critical factor in RHM-containing wetted cathode cells as the carbon is used to bond the RHM particles in the cathode coating. An excessive rate of carbon loss results in undercutting $TiB_2$ particles in the matrix, and a subsequent increase in $TiB_2$ loss from the cathode surface. Excessively low carbon loss would result in areas of local depletion of $TiB_2$ particle concentration at the cathode surface, and subsequently a loss of aluminum wetting.

The $TiB_2$ preferred for use in this invention is typically specified as −325 mesh. If the $TiB_2$ is made by carbothermic reduction on titanium and boron oxides and carbides, individual particles will normally fit the prerequisite category of single crystals. This also holds true for $TiB_2$ made by plasma methods described in U.S. Pat. No. 4,282,195 to Hoekje of PPG Industries. Producing $TiB_2$ by an arc melting process generally results in a polycrystal comprised of relatively large individual crystals. Hence, on crushing to −20 mesh, this would normally provide particles that each have only short sections of internal grain boundary. If −325 mesh $TiB_2$ powder is made by crushing arc-melted $TiB_2$ chunks, each of the resulting particles is smaller than the original individual crystals, so that each particle consists of a broken piece of a larger crystal (or, for example, 2 or 3 crystals joined together by some inter-crystalline boundaries). Thus, very few crystals would be entirely isolated from the binder system, and even if the few inter-crystalline boundaries are completely dissolved by the bath, very few crystals of $TiB_2$ would break away.

$TiB_2$ made by carbothermic reduction of powders is typically composed of material that is easily crushed to −325 mesh without breaking many of the individual crystals. This material, when viewed in a scanning electron microscope, is seen to be composed of tiny single crystals, open clusters of $TiB_2$ single crystals, and broken pieces of $TiB_2$ single crystals.

Other RHM materials may be successfully substituted for $TiB_2$ in the coatings disclosed herein, when appropriate changes in the coating composition are made to account for differences in wettability, surface area, particle size, porosity, and solubility of the RHM. Sufficient RHM is incorporated in the coating composition to ensure aluminum wetting, while thermal expansion mismatch effects are minimized and a dissolution rate of Refractory Hard Material less than the rate of loss of the carbon matrix of the coating is achieved. While discussion of the invention will focus on the use of $TiB_2$ as the preferred RHM, it is contemplated that any suitable RHM, such as $ZrB_2$, or alloys of Refractory Hard Materials, may be utilized. Sufficient RHM is provided in the coating composition to ensure wettability. In general, the RHM may comprise from about 10 to about 90 percent by weight of the coating composition, and preferably from about 20 to about 70 percent. It has been found that wettability may be achieved at concentrations below about 10 percent, but better results are achieved at ranges from 20 percent upward, with from about 35 to about 60 percent being the most preferred range.

The resinous binders of the present invention may comprise any which meet the aforementioned criteria. Typical resins which can be employed include phenolic, furane, polyphenylene, heterocyclic resins, epoxy, silicone, alkyd, and polyimide resins. Examples of phenolic resins which can be employed include phenol formaldehyde, phenol acetaldehyde, phenol-furfural, m-cresolformaldehyde and resorcinolformaldehyde resins. Epoxy resins which can be utilized include the diglycidyl ether of bisphenol A, diglycidyl ether of tetrachlorobisphenol A, diglycidyl ether of resorcinol, and the like, and especially the epoxy novolacs. Preferred epoxies comprise the glycidyl ethers such as the glycidyl ethers of the phenols, and particularly those prepared by reacting a dihydric phenol with epichlorhydrin, e.g., the diglycidyl ether of bisphenol A, and epoxy novolacs. The silicone polymers which can be employed include methyl siloxane polymers and mixed methyl phenyl siloxane polymers, e.g., polymers of dimethyl siloxane, polymers of phenylmethylsiloxane, copolymers of phenylmethylsiloxane and dimethylsiloxane, and copolymers of diphenylsiloxane and dimethylsiloxane. Examples of heterocyclic resins are polybenzimidazoles, polyquinoxalines and pyrrones. Any of the well known specific alkyds, particularly those modified with phenol formaldehyde, and polyimide resins can be employed. The phenolics and furanes are the preferred class of resins, particularly in view of relatively low costs.

Furane resins are very advantageously employed as the resinous binder of this invention. Acids and bases commonly are used as catalysts for furane resin polymerization, but may not be required as furanes may copolymerize with other resin in the absence of catalysts. Suitable acid catalysts include inorganic and organic acids such as hydrochloric acid, sulfuric acid, nitric acid, orthophosphoric acid, benzene sulfonic acid, toluene sulfonic acid, naphthalene sulfonic acid, maleic acid, oxalic acid, malonic acid, phthalic acid, lactic acid, and citric acid. This family of catalysts also includes organic anhydrides such as maleic anhydride and phthalic anhydride. Examples of further satisfactory conventional acid catalysts include mineral acid salts of urea, thiourea, substituted ureas such as methyl urea and phenyl thiourea; mineral salts of ethanol amines such as mono-, di-, and triethanolamine; and mineral acid salts of amines such as methyl amine, trimethyl amine, aniline, benzyl amine, morpholine, etc. Preferred acid catalysts have a $K_a$ of at least $10^{-3}$.

Suitable basic catalysts include alkali hydroxides such as lithium hydroxide, sodium hydroxide, potassium hydroxide, and the like; and alkaline earth hydroxides such as magnesium hydroxide, calcium hydroxide, and the like. Other satisfactory base catalysts include for example, amine catalysts such as primary amines like ethyl amine, propyl amine, etc.; secondary amines like diisopropyl amine, dimethyl amine, etc.; and tertiary amines like triisobutylamine, triethylamine, etc. Examples of other satisfactory base catalysts are mixtures of alkali hydroxides and alkaline earth hydroxides such as mixtures of sodium hydroxide and calcium hydroxide. A mixture of alkali hydroxides and alkaline earth hydroxides provides a thermosetting binder giving unexpectedly high carbon yields. Suitable amounts of catalyst or curing agents are included with the resinous binder, dependent upon the specific binder selected. Determination of the appropriate curing agent, and the appropriate amount thereof, are within the skill of the art.

By the term "acid cured furane resins" is meant resins such as homopolymers of furfuryl alcohol, homopolymers of furfuryl alcohol cross-linked with furfural, copolymers of furfuryl alcohol and formaldehyde, copolymers of furfuryl alcohol and phenol, copolymers of furfural and phenol, or monomeric materials which contain the furane ring somewhere in the structure, and are capable of being cured to a final set and hardened mass by the addition thereto of an acid catalyst.

Resinification of the compositions in question is dependent upon hydrogen ion concentration and is accelerated by heating, as is well known. Because the reaction occasioned by the addition of the acidic catalyst to the resin is exothermic, care must be taken in the selection and amount of catalyst used, otherwise resinification may proceed too rapidly and the resultant mass may be useless. For this reason, inorganic acids such as hydrochloric acid, sulfuric acid, phosphoric acid and chromic acid generally are not used. On the other hand, inorganic acid salts such as zinc chloride, sodium bisulfate and mercuric chloride are often used, as are latent acid catalysts such as maleic anhydride and phthalic anhydride, which only on heating yield the necessary acid catalyst.

In general, organic compounds ordinarily are preferred to achieve the desired properties in acid cured furane resinous products. In addition to the aromatic sulfonic acids, the aromatic sulphonochlorides such as benzene sulphonochloride, paraacetyl benzene sulphonochloride; the aliphatic amino salts of the aromatic sulphonic acids, including the ammonium salts such as ammonium paratoluene sulphonate, dimethyl amino benzene sulphonate, diethyl amino toluene sulphonate, ammonium benzene sulphonate and disulphonate, ammonium phenol sulphonate, ammonium naphthalene sulphonate and disulphonate, ammonium anthracene sulphonate and disulphonate, ammonium sulphanilate; the aromatic amino salts of aromatic sulphonic acids such as the aniline salt of benzene sulphonic acid, the aniline salt of paratoluene sulphonic acid, and the pyridine salt of phenol sulphonic acid; the organic salts of strong inorganic acids such as glyoxal sulphate; the metallic salts of chlorosulphonic acid such as sodium chlorosulphonate and potassium chlorosulphonate; the aliphatic and aromatic salts of strong inorganic acids such as triethanolamine chloride, aniline hydrochloride, ammonium sulphamate, pyridine sulphate, pyridine bisulphate, and aniline sulphate; the amino salts of sulphanilic acid such as aniline sulphanilate and pyridine sulphonate; the ferric salts of sulphonic acids such as ferric trichlorobenzene; acid anhydrides such as phosphoric anhydride and maleic anhydride; the ammonium salts of alkane sulphonic acids such as ammonium ethane sulphonate; the ferric salts of sulphonic acids such as ferric benzene sulphonate and ferric toluene sulphonate; and the ammonium salts of organic substituted inorganic acids such as ammonium ethyl phosphate, have been used as catalysts for furane resins.

Alkaline catalysed furane binders suitable for practice of the present method include furfural plus a phenol, furfural plus a ketone, and furfuryl alcohol plus an aldehyde and an amine. The furane binder may optionally be mixed with pitch, to form a binder material. This binder material may be mixed with a carbon aggregate or filler. Pitches, such as coal tar pitches, may be present as a modifying component of the binder system, and high boiling point condensed aromatic systems from those are frequently found as impurities in filler materials derived from pitch. Furane binders as contemplated herein, suitable for use in the present invention, include the following (with appropriate catalysts):

a. furfural plus a phenol; specific example: furfural and phenol;
  b. furfural plus a ketone; examples: furfural and acetone, or furfural and cyclohexanone;
  c. furfuryl alcohol plus an aldehyde and an amine; specific example: furfuryl alcohol and formaldehyde and urea.

One example of a furfural binder suitable for use in the present invention, which is relatively fluid at room temperature and has a suitable char yield, is a mixture consisting essentially of between 50 and 75 percent by weight of coal tar pitch having a softening point above 100° C., and between 50 and 25 percent by weight of monomeric polymerizable thermosetting dispersants consisting of furfural and a member selected from the group consisting of phenol, cyclohexanone, and compounds having the formula:

$$CH_3-CO-R$$

wherein R is a hydrocarbon group having between 2 and 4 carbon atoms, inclusive, and a catalyst. The hydrocarbon group in the above formula may be saturated or unsaturated and straight or branched chain. To this binder may then be added appropriate amounts of RHM and carbonaceous fillers to obtain an effective coating composition. The time and temperature necessary to solubilize the coal tar pitch in the dispersants will vary with the softening point of the coal tar pitch, the total amount of dispersants, and the relative amounts of the several dispersants. Excessive heats should be avoided to prevent premature polymerization of the binder. While the parameters of time and temperature necessary to solubilize the coal tar pitch in the dispersants cannot be generally stated, they are easily determined by one skilled in the art. In this type of coating composition, the pitch does not function as a modifying agent for the binder, but rather as a functional ingredient having a desirably high char yield.

Generally speaking, molar ratios of furfural to phenol between 0.5 and 2 moles of furfural to 1 mole of phenol are preferred when phenol is the second ingredient of the dispersant component; and molar ratios between 1 and 2 moles of furfural to 1 mole of cyclohexanone, methyl aliphatic ketone of the above formula, or mixtures thereof are preferred when cyclohexanone, methyl aliphatic ketone, or mixtures thereof are the second ingredient of the dispersant component.

One currently commercially available alkaline-catalyzable furane binder, having utility in the present invention, is that obtainable from Quaker Oats Company under the commercial or trade designation "QX-362". It is presently believed that the principal constituents of this binder are furfural and cyclohexanone, although some furfuryl alcohol may also be present.

A group of furfuryl resins which is considered suitable in accordance with the invention is furfuryl alcohol copolymers made by reacting maleic acid or maleic anhydride with a polyhydroxy compound such as ethylene glycol. This forms an ethylenically unsaturated, polycarboxylic acid ester prepolymer. The ester prepolymer is then copolymerized with furfuryl alcohol to produce the furfuryl alcohol copolymer. The furfuryl alcohol copolymers described are advantageous because of certain properties such as relatively low volatility, ease of storage, giving off of a minimum of water upon curing, resistance to excessive shrinkage and a relatively short cure reaction. Such copolymers may also be quite suitable for use in accordance with the present invention because of other properties, namely their ability to remain highly flexible after curing.

In addition to those set forth as components of the commercially available carbon cements, such as UCAR ® C-34, discussed hereinafter, a wide variety of novolac resins may be used as the basic resinous binder in the present invention. The term novolac refers to a condensation product of a phenolic compound with an aldehyde, the condensation being carried out in the presence of an acid catalyst and generally with a molar excess of phenolic compound to form a novolac resin wherein there are virtually no methylol groups such as are present in resoles, and wherein the molecules of the phenolic compounds are linked together by a methylene group. The phenolic compound may be phenol, or phenol wherein one or more hydrogens are replaced by any of various substituents attached to the benzene ring, a few examples of which are the cresoles, phenyl phenols, 3,5-dialkylphenols, chlorophenols, resorcinol, hydroquinone, xylenols, and the like. The phenolic compound may instead be naphthyl or hydroxyphenanthrene or another hydroxyl derivative of a compound having a condensed ring system. It should be noted that the novolac resins are not heat curable per se. Novolac resins are cured in the presence of curing agents such as formaldehyde with a base catalyst, hexamethylenetetramine, paraformaldehyde with a base catalyst, ethylenediamineformaldehyde, and the like.

For purposes of the present invention, any fusible novolac which is capable of further polymerization with a suitable aldehyde may be employed. Stated another way, the novolac molecules should have two or more available sites for further polymerization and/or cross-linkage. Apart from this limitation, any novolac might be employed, including modified novolacs, i.e., those in which a nonphenolic compound is also included in the molecule, such as the diphenyl oxide or bisphenol-A modified phenol formaldehyde novolac. Mixtures of novolacs may be employed or novolacs containing more than one species of phenolic compounds may be employed.

Novolacs generally have a number-average molecular weight in the range from about 500 to about 1,200, although in exceptional cases the molecular weight may be as low as 300 or as high as 2,000 or more. Unmodified phenol formaldehyde novolacs usually have a number-average weight in the range from about 500 to about 900, most of the commercially available materials falling within this range.

Preferably, novolacs with a molecular weight from about 500 to about 1,200 are employed in the present invention. When a very low molecular weight novolac is used, the temperature at which such novolacs soften and become tacky is usually comparatively low.

A mixture of pitch and novolac may be formed by any convenient technique such as dry blending or melting the pitch and novolac by heating together to form a homogeneous mixture. Various pitches may be utilized for this purpose, as previously indicated.

In addition to the novolac phenolic resins, the use of resoles is also within the scope of the present invention.

Resole resins are most frequently produced by the condensation of phenols and aldehydes under alkaline conditions. Resoles differ from novolacs in that polynuclear methylol-substituted phenols are formed as intermediates in resoles, and resoles are produced by reaction of phenolic substances with excess aldehyde in the presence of an alkaline catalyst. A resole produced by the condensation of phenol with formaldehyde most likely proceeds through intermediates having the following type of structure:

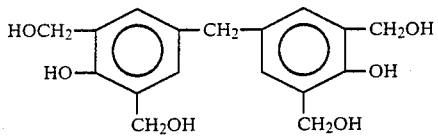

In a typical synthesis, resoles are prepared by heating one mole of phenol with 1.5 moles of formaldehyde under alkaline conditions.

The resole resins are prepared by the condensation of phenols with formaldehyde, or more generally, by the reaction of a phenolic compound, having two or three reactive aromatic ring hydrogen positions, with an aldehyde or aldehyde-liberating or engendering compound capable of undergoing phenol-aldehyde condensation. Illustrative of phenols are phenol, cresol, xylenol, alkyl phenols such as ethylphenol, butylphenol, nonylphenol, dodecylphenol, isopropylmethoxyphenol, chlorophenol, resorcinol, hydroquinone, naphthol, 2,2-bis(p-hydroxyphenyl)propane, and the like and mixtures of such phenols. Large aliphatic groups substituted on the benzene ring may detract from the present invention, since these are lost in heating and hence may decrease char yield and increase volatile emission. Illustrative of aldehydes are formaldehyde, paraformaldehyde, acetaldehyde, acrolein, crotonaldehyde, furfural, and the like. Illustrative of the aldehyde engendering agents is hexamethylenetetramine. Ketones such as acetone are also capable of condensing with the phenolic compounds to form phenolic resins.

The condensation of a phenol and an aldehyde is conducted in the presence of alkaline reagents such as sodium carbonate, sodium acetate, sodium hydroxide, ammonium hydroxide, and the like. When the condensation reaction is completed, if desired, the water and other volatile materials can be removed by distillation, and the catalyst neutralized.

The resole resins are termed heat curable resins. That is, under the application of heat these resins progressively polymerize until they are finally insoluble, infusible and completely cured. For the purposes of the present invention, the curable phenolic resins are considered those which have not so advanced in polymerization that they have become infusible.

Furfuryl alcohol may be employed as the mix liquid in the phenolic carbonaceous binder, and is believed to react with the phenolic resin as it cures, and serves as a modifying agent for the resin. The use of furfuryl alcohol is preferred as it has been found that bonds having the high strength obtainable through the use of this mix liquid cannot be produced when other mix liquids are substituted for furfuryl alcohol. Thus, for example, when furfuraldehyde is employed in place of furfuryl alcohol in otherwise identical compositions, bonds are produced having only about half the strength of the bonds produced using the furfuryl alcohol.

Since the net final effect desired is to achieve a surface layer composed essentially of RHM and carbon, the binder system should be readily decomposable, in high yield, to a carbon residue. Such components as resinous binder should comprise from about 1 to about 40 percent of the coating composition, whether as a part of a carbon cement or as a custom carbon system. The resin per se may constitute up to about 50 percent or more by weight of the coating composition. Although higher resin concentrations are possible, little advantage is attained, and extended cure and carbonization cycles may be required. The carbon system should comprise about 10 to about 90 percent of the coating composition, preferably from about 30 to about 80 percent, and most preferably from about 40 percent to about 65 percent of the coating composition applied to the substrate.

One may utilize appropriate blends of carbon and phenolic resin or other thermosetting resinous binders of the appropriate particle sizes, or alternative commercial compositions. The mix liquid component of the coating composition may vary from approximately 2 weight percent to about 40 weight percent for reasonable evaporation and curing rates, with about 5 percent to about 25 percent being preferred to obtain workable consistency. It is desired that the coating composition be workable and easily spread, as by a trowel. Insufficient liquid will make the mix dry and unspreadable, while excessive liquid results in difficulties in curing and baking.

Various modifying agents may be present to modify the nature of the resinous binder during mixing, curing, and carbonization of the coating composition. These may typically constitute from zero to about 10 percent by weight of the coating composition. Suitable modifying agents for phenol formaldehyde resins, for example, include rosin, aniline, copolymers, resin "alloys", etc. Rosin modified phenolics have an important combination of solubility, viscosity and drying characteristics. A well known method of preparing phenolic resins for use in surface coatings involves the heating and blending of phenol-formaldehyde condensates with rosin. Preferably the condensate used is one made from alkyl phenols by alkaline condensation.

Aniline modified phenolics are prepared by treatment of an intermediate phenol formaldehyde condensate with aniline or aniline derivatives, by co-condensation, or by blending a phenol formaldehyde condensate with an aniline-formaldehyde condensate. Aniline modified phenolics have particularly good electrical characteristics. Phenolic resins may be copolymerized with such materials as chlorinated phenols, nitromethane, and organosilicon compounds, e.g. siloxane.

Some of the materials used to treat intermediate phenol formaldehyde condensates are epichlorohydrin, ether resin, ethylene oxide polymers, hydrogen peroxide, ketones, methylolaniline HCl, polyvalent salts of hexanoic acid, stannous chloride, and terpene-phenol products.

In addition, blends of various resinous materials with phenolic resins may be prepared. Exemplary of the more common resin "alloys" are phenolic resins and epoxy resins, ketone-aldehyde condensates, melamine and urea resins, natural and synthetic rubber, polyvinyl chloride, and polyvinal acetal resins.

Through such modifications, it is quite possible to considerably modify the binder system of the present application. For example, replacement of phenol with meta-cresol would yield a resin soluble in alcohol, having a fast drying time. Such might be advantageous under certain circumstances and cure time requirements. Replacement of phenol with meta-alkyl phenol gives a resin which is more rubbery and flexible, but has less tensile strength. Replacement of phenol with substituted phenols, e.g. p-tertiary butyl phenol, yields resins which are oil soluble, while replacement of phenol with naphthalene and anthracene derived phenols does not alter the phenolic properties greatly but could yield greater compatibility with pitch, in binder systems employing pitch. Replacement of formaldehyde with higher aldehydes, such as acetaldehyde, results in the resin becoming oil soluble.

The addition of glycerol to phenol formaldehyde resoles acts as a plasticizer in the binder systems of the present application. Anthracene oil, on the other hand, may be added to furfuryl alcohol as a stabilizer prior to the addition of acid catalyst. Stabilization assists in controlling the rate of polymerization in the presence of acid catalysts.

Certain specific blends are noteworthy. For example, phenol formaldehyde modified with phenol-furfuryl resin has a flat plasticity curve, and does not go through a rubbery stage such as exhibited by phenol formaldehyde. Hence, blends of phenol formaldehyde with phenol-furfuryl are suitable. They offer excellent impact resistance, chemical resistance, rapid cure at high temperatures, and a high capacity for filler. Blends of phenol formaldehyde with certain thermoplastics produce resins suitable for bonding to metal, such as may be considered for use with metallic cathode substrates. Blends with butadiene/acrylonitile copolymer rubber give improved impact resistance, while blends with resorcinolformaldehyde resins give faster reaction rates and lower cure temperatures. These resins, however, are somewhat more expensive for utilization in the present invention.

Frequently, pitch is present in the coating composition, as a modifying agent or a binder, in concentrations of up to about 50 or even 75 percent when present as a functional ingredient of the binder system. When present as a modifying agent per se, pitch may be present in concentrations up to about 10 percent by weight of the coating composition.

In addition to the RHM and binder system, which may itself include a filler material, it is desirable to provide additional particulate carbon. Some particulate carbon, either amorphous or graphitic, is frequently present in the commercially available cements mentioned heretofore. Further particulate carbon may be added, as either fine powder or coarse aggregate, or mixtures thereof, in the form of amorphous carbon or graphitic carbon.

It is highly desirable to have a carbonaceous filler material present, either as a component of a proprietary carbon system or present in a commercial cement, or as an addition to a commercial cement. Such carbonaceous filler is −100 mesh, and preferably −325 mesh, and may comprise fine carbonaceous flour, graphite flour, crushed coke, crushed graphite, carbon black, and the like. The presence of such fine flours yields improved packing density for the granulometry used, that wicks up resin forming liquids to form a dense, highly bonded carbon matrix upon carbonization.

Carbonaceous filler, as fine flour, should comprise from about 1 percent to about 60 percent of the coating composition, with about 10 percent to about 40 percent being preferred.

The carbonaceous additive, or aggregate material, if present, may run from −4 mesh to +100 mesh, and is preferably between −8 mesh and +20 mesh. Such coarse aggregate apparently permits micro-cracking, assists volatile emission release, reduces shrinkage, and contributes to high carbon yield. Carbonaceous additive, as aggregate and/or fiber, should comprise from about 0 percent to about 70 percent of the coating composition, with from about 5 percent to about 15 percent being preferred.

As previously set forth, it is preferred that carbon fiber be added to the coating composition as a crack arrestor. When such fiber is used, some variations in composition ranges have been found. When carbon fibers are used, they may preferably be made from pitch precursors, organic fiber precursors such as polyacrylonitrile, or rayon. Pitch fibers are considerably cheaper, and accordingly preferred. Fiber weight may range from zero percent to about 10 percent by weight of the coating composition, preferably from about 0.05 to about 1.0 percent, and more preferably from 0.05 to about 0.5 percent. However, concentrations greater than about 10 percent become comparatively expensive, with little apparent added benefit. Carbon fibers with lengths varying from about 0.16 cm to 1.27 cm length are preferred. Short fibers permit easier mixing and application, and may be used in higher concentration. Sized fibers, consisting of parallel fiber strands bonded together by a material soluble in the mix liquid, are particularly preferred, since they blend most easily with the binder system. Fiber orientation may vary, and the fibers can be mixed as an integral part of the coating composition to facilitate the application procedure.

It is also possible to modify the carbonaceous filler utilized in the present invention. In this respect, a number of modifying agents may be added to the filler. For example, silica may be added to the carbonaceous filler to impart non-sintering properties to the binder system. In general, however, inorganic fillers make the resinous binder harder to process in accordance with the present invention and decrease char yield.

Gas release agents are appropriately included in the coating composition to avoid blisters and/or excessively large cracks. Suitable gas release agents include combustible oils, soaps, and waxes.

A combustible oil can be employed as the gas release agent in the carbonaceous binder. In order to avoid volatilizing the oil while curing the phenolic resin, it is desirable that the oil have a boiling point higher than the curing temperature of the resin. For this reason, oils having a boiling point above about 150° C., preferably above about 200° C., are most useful, with oils having a boiling point above about 250° C. being particularly preferred. While petroleum-base oils, such as paraffin oils, aromatic oils and asphaltic oils, are preferred, other oils, such as animal and vegetable oils, can also be employed. Among the petroleum-base oils, the paraffin oils are preferred. Illustrative of the animal and vegetable oils which can be employed are palm kernal oil, olive oil, peanut oil, beef tallow oil, cottonseed oil, corn oil, soybean oil, and the like. Amounts of oil of up to 3.5 percent by weight of the coating composition, preferably from about 0.4 percent by weight to about 2.0 percent by weight, are suitable.

Soaps may also be used as gas release agents. While the soap employed can be any of the metallic or quaternary ammonium salts of the fatty acids, binders prepared with either the neutral or acid quaternary ammonium soaps are more resistant to oxidation than cements prepared with the more common metallic soaps, so that the use of the non-metallic soaps is preferred. Such non-metallic soap is produced by the reaction of a fatty acid with triethanolamine. The fatty acids employed, like the fatty acids employed to produce metallic soaps, generally contain from about 10 to about 24 carbon atoms, and can be either saturated or unsaturated. Among the saturated fatty acids which can be employed are capric, lauric, myristic, palmitic, stearic, arachidic, behenic, tetracosanoic, and the like. Typical unsaturated fatty acids include palmitoleic, oleic, linoleic, arachidonic, cetoleic, erucic, selacholeic, and the like. Amounts of soap of from about zero percent by weight to about 15 percent by weight or higher of the coating composition, preferably from about 0.5 percent by weight to about 5.0 percent by weight, are suitable.

Various waxes may also be employed as gas release agents. Suitable waxes include various grades of petroleum wax including such usual paraffin waxes as refined slack, sweat, scale, block, and microcrystalline wax.

A preferred binder system is that which is commercially designated as UCAR ® C-34, marketed by Union Carbide. This composition is believed to comprise a mixture of an oil, a soap, finely-divided carbonaceous particles, furfuryl alcohol, a phenolic resin of the novolac type, and a hardening agent for the phenolic resin. The mixture of the oil, finely-divided carbonaceous particles, phenolic resin, and phenolic resin hardener can be prepared by blending the carbonaceous particles, phenolic resin and phenolic resin hardener together in any conventional manner, e.g. in a tumbling barrel, spraying the oil into the resulting mixture, and further blending the mixture until the oil has been incorporated therein and a substantially homogeneous blend formed. The mixture of soap and furfuryl alcohol can be prepared by heating the soap up to a temperature of about 100° C. to liquify it, and then dissolving the molten soap in the furfuryl alcohol. Upon cooling, the soap remains dissolved in the furfuryl alcohol as a stable solution which can be stored until it is ready to be mixed with the mixture of oil, finely divided carbonaceous particles, phenolic resin, and phenolic resin hardener The two mixtures, one liquid and the other essentially solid, can be readily mixed at room temperature, either manually or mechanically.

Many phenolic resins of the novolac type can be employed in the UCAR ® C34 cement. Such resins are produced by condensing phenols, such as phenol itself, m-cresol, p-cresol, o-cresol, 3,5-xylenol, 3,4-xylenol, 2,5-xylenol, p-ethylphenol, p-tert-butylphenol, p-amylphenol, p-tert-octylphenol, p-phenylphenol, 2,3,5-trimethylphenol, resorcinol, and the like, with aldehydes such as formaldehyde, furfuraldehyde, acetaldehyde, and like. In practice, an unsubstituted phenol-formaldehyde resin may be employed for cost considerations Curing of the novolac resin to the thermoset state can be effected by means of any hardening agent conventionally employed to cure such resins. Such hardening agents are conventionally materials such as paraformaldehyde, furfural, or hexamethylenetetramine, with appropriate catalysts when necesary, which upon the application of heat generate aldehydes which react with the resin and cause it to crosslink. The novolac resin is suitably employed in the UCAR ® C-34 cement in an amount of from about 0.5 percent by weight of the coating composition to about 15 percent by weight, most preferably from about 2.5 percent by weight to about 8 percent by weight. The hardener for the resin is employed in an amount sufficient to cure such resin to the thermoset state, i.e., in an amount which will provide at least sufficient formaldehyde to react with and crosslink the resin, and provide sufficient alkaline catalyst for the reaction.

Many foras of finely-divided carbon or graphite can be employed as components of the UCAR ® C-34 carbonaceous cement. Suitable carbonaceous materials include graphite flour, petroleum coke flour, pitch coke flour, calcined lampblack flour, thermatomic black (made by the passage of natural gas over hot refractories), and the like. Amounts of the carbonaceous flour of from about 1 percent by weight of the coating composition to about 60 percent by weight, preferably from about 10 percent by weight to about 40 percent by weight, are suitable. Most preferably, the carbonaceous flour is a mixture of graphite and thenmatomic black, with the graphite flour being present in an amount of from about 2 percent by weight to about 50 percent by weight and the thermatomic black being present in an amount of from about 0.5 percent by weight to about 25 percent by weight.

Suitably, furfuryl alcohol is employed in UCAR ® C-34 cement, and may be present in an amount of from about 2 percent by weight of the coating composition to about 40 percent by weight, most preferably from about 4 percent by weight to about 20 percent by weight.

Additional suitable carbon cements are commercially available, such as UCAR ® C-38, (Union Carbide), a composition very similar to UCAR ® C-34 but containing an oxidation inhibitor; Stebbins AR-25-HT, a furane resin composition comprised of furfuryl alcohol, partially polymerized furfuryl alcohol in forms such as difurfuryl ether, and a latent catalyst which could be phthalic anhydride or a derivative thereof; Stebbins AR-20-C, comprising a partially polymerized furane resin in forms such as difurfuryl ether, together with furfuraldehyde, and a latent catalyst which could be phthalic anhydride or a derivative thereof; and Atlas CARBO-KOREZ, a phenolic resin composition comprising a phenolic novolac or resole resin in a solvent as mix liquid, cured by combination with a phenolic novolac in the solids. The solvent is probably an aliphatic alcohol such as butyl alcohol. Other suitable carbon cements include Atlas CARBO-ALKOR, comprising furfury alcohol monomer and partially polymerized forms such as difurfuryl ether and a latent catalyst which could be phthalic anhydride or a derivative thereof; DYLON GC, comprising furfuryl alcohol as solvent and monomer which cures together with a phenol formaldehyde and hexamethylenetetramine hardener; and Aremco GRAPHI-BOND ™ 551-R, comprising furfuryl alcohol and a latent catalyst The coating composition may be applied to the cathode of an aluminum cell as single or multiple layers. A multiple layer coating system may provide a stronger bond, due to greater penetration of the pore structure of the carbon cathode by a first bonding layer which does not incorporate $TiB_2$, and permits easier and more rapid cure of the coating. Further, the use of plural layers may also reduce the size and number of shrinkage cracks in the $TiB_2$-containing top layer. In still another preferred embodiment, the coating composition may typically comprise up to about 10 percent by weight of carbon fiber, which acts to inhibit crack formation, strengthen the coating, and lessen any tendency for exfoliation of the coating, particularly at any. point of contact with the bath. The carbon cement that is applied to the cathode substrate as a bonding layer may contain up to 40 percent extra carbonaceous filler and additive, which help to prevent cracking of the substrate due to stress forces encountered during curing and carbonization of the coating, by modifying the strength of the bond between the substrate and the bonding layer.

The improved operation of full-scale (105K amp) VSS aluminum reduction cells constructed with coated cathodes in accordance with this invention continues to demonstrate the productivity improvements resulting from this invention. While the examples below illustrate the preferred specifications of the improved coating composition and process, it is possible to obtain a viable coating by many similar procedures. The examples were prepared by coating the cathode blocks prior to their assembly on the collector bars and the ramming process. In commercial practice, it is possible that an in-cell coating would be used to coat all or part of the bottom and side wall surfaces of a rammed cathode. The entire cathode coating could then be cured and carbonized in a single operation using, for example, a hooded heater placed over the coated rammed cathode. This could result in economies in time and coating costs and provide a fully monolithic cathode without ram joints, as well as reducing bake-in emissions and improving the baking process to give an improved baked ram in the slots and sidewalls.

The coating composition can be applied to each cathode block, cured, and carbonized before being set into position. Alternatively, the cathode can be assembled and rammed, the coating applied and then cured. The carbonization process would occur in the cell in this case. Curing may be accomplished in stages, whereby the coated substrate is gradually raised to the desired curing temperature at which a relatively hard surface is obtained, followed by carbonization at temperatures up to 1100° C. In the initial states of such curing, volatile components, such as the mix liquid volatiles and reaction products are removed, while at higher temperatures, e.g. 250° C. to 1100° C., carbonaceous materials, such as cross-linked phenolic resin, are decomposed to leave a non-graphitizing carbonaceous ratrix containing RHM. This carbonization step may be carried out directly after the initial cure by heating the coated carbon substrates to the desired temperature, or subsequent to said cathode substrate being placed in the electrolytic cell. Alternatively, the carbon cathode blocks may be placed in position in the cell after coating and initial curing, followed by "bake-in" of the coated cathode by cell start-up and operation. Alternative orders of coating, curing, carbonizing, assembling, setting, and ramming may of course be utilized.

The area coated may range from the entire inner surface of the cathode cavity to less than 10 percent of the cathode surface below the anode or anodes. The area to be coated ranges from 50 to 100 percent of the cathode surface directly below the anode or anodes, with the preferred area ranging from 70 percent to 100 percent of said area. It may, however, be desirable to leave some uncoated area, to permit cathode ram degassing during cell heat-up and start-up, for example.

The RHM coating need not be continuous over the entire cathode surface. In the case of $TiB_2$ tiles, small gaps between adjacent tiles (1 mm to 5 mm) will be bridged by the molten metal. Similarly, $TiB_2$ particles in a carbon surface at an appropriate concentration will produce a pseudo-continuous aluminum wetting film by bridging between adjacent $TiB_2$ particles. In the case of the coating composition of this invention, 20 weight percent $TiB_2$ in the surface will produce a pseudo-aluminum wetted surface. A preferred overall content of $TiB_2$ in the surface layer of 35–60 weight percent will allow for mixing inhomogeneities and a longer coating life. Modification of the RHM particle properties and/or changing the coating formulation and/or the RHM distribution within the coating may enable the use of lesser amounts of RHM. Cracks in the coating should be less than 5 mm in width, preferably less than 1 mm wide.

Two different types of $TiB_2$ powder have been used in the test cells. No difference could be detected in the mixing and coating procedures when the high purity (+99.5%) $TiB_2$ was replaced by less pure (98%) material. A carbothermic process was used to produce the high purity powder while an arc melting process was used to produce the lower cost, less pure powder.

While no minimum or maximum coating thickness has yet been defined, thicker coatings provide longer coating life. However, the tendency is greater for crack formation and higher coating costs with thicker coatings. The preferred coating thickness is from about 1 cm to about 1.6 cm to minimize the tendency for blister formation or crack formation in the coating during cure and carbonization. Maximum coating thickness should be consistent with anticipated cell life; i.e. there is no need to have a coating thickness to last 10 years if cell life is anticipated to be only 7 years.

It is also contemplated that the coating composition of this invention may be applied as a single layer or as of a plurality of layers, which layers may be individually cured between applications. In accordance with this concept, it is possible to produce a substantial coating thickness (e.g. 5 cm or more) by successively applying thin layers of coating composition and curing such layers individually. For greatest bonding strength, it may be desirable to treat the surface of each cured layer, by scuffing or wire brushing, for example, prior to application of the next layer. It is also possible, bY this technique, to obtain a graduated RHM content within the coating, by changing the RHM concentration in successive layers of coating composition.

The general procedure used to coat individual cathode blocks, assemble the cathodes, and cut-in cells is summarized below.

1. Wire brush and vacuum clean the top surface of the cathode blocks.
2. Attach mold around the top of each block.
3. Mix dry coating components.
4. Preheat coating materials and blocks.
5. Mix the coating composition.
6. Apply a thin coating and work it into the block surface.
7. Complete application of coating and use a bar to level coating with top of mold.
8. Wait 15–30 minutes before using a metal trowel to semi-smooth the coating surface.
9. Insert a thermocouple in the side of the coating and place coated blocks in cure oven.
10. Cure.
11. Remove coating molds from the blocks.
12. Place the cured blocks in a metal box, cover with coke and heat to partially carbonize.
13. Cool the blocks before removing them from the coke bed.
14. Cast the blocks on collector bars.

15. Ram the collector bar assemblies in cathode shell and ram side walls.

16. Wire brush excess ram off the coated block surface.

17. Follow coventional procedures for cathode installation, bake and cut-in.

The uniformity, workability and bonding properties of the coating are strongly influenced by temperature. The preferred premixing temperatures of the mix liquid and solid portions of the coating composition are 40°–45° C. and 30°–35° C., respectively. A premixing temperature range of 20°–45° C. has been used for the mix liquid and solid components without any severe problems. The temperature of the cathode block or surface to be coated should be between 20° C. and 65° C., preferably between 40° C. and 50° C.

A low premixing temperature resulted in non-unifonm mixing and the need to add more solvent to make the coating workable. Both produced small blisters in the coating. A high premixing temperature caused a partial premature curing of the coating which resulted in poor workability and poor bonding to the carbon substrate.

A low block temperature made it difficult to uniformly spread the coating and achieve the required wetting of the carbon substrate necessary for good bonding. A high block temperature caused partial premature curing and excessive shrinkage in the coating. Excessive shrinkage increased the tendency for crack formation and delamination from the carbon substrate.

As indicated, certain ranges of acceptable temperatures for preheat treatment of the coating composition and the cathode blocks exist. It is also noted that coating thickness may vary from approximately 0.6 cm to 1.6 cm or higher. Preferred ranges are set forth in Table I.

TABLE I

| Application Parameters | | |
|---|---|---|
| | Ranges | |
| Item | Acceptable | Preferred |
| Preheat dry components prior to mixing | 20–45° C. | 30–35° C. |
| Preheat liquid component prior to mixing | 20–45° C. | 40–45° C. |
| Preheat cathode blocks prior to coating | 20–65° C. | 40–50° C. |
| Coating thickness | 0.6–1.6 cm | 1.0–1.3 cm |

The tendency for blister formation in the coating was affected by the degree and technique used to finish the top surface of the applied wet coating. A finished smooth surface achieved by either dry or wet working the coating surface exhibited a greater tendency to fonm blisters than a rough trowelled surface. A smooth surface promoted the rapid formation of a film, which sealed the surface and interfered with the release of blister forming gases evolved during curing. Conversely, the imperfections in the partially smoothed surface promoted the release of gas during the cure cycle. The surface of eight blocks coated with the formulation given in Example 6 were finished smooth by both wet and dry working, and blisters were observed in the coatings of these eight blocks, after curing. Blister-free coatings on 52 subsequent blocks using the same formulation were achieved by only partially smoothing the surface of the wet coating.

The surface texture of different finishes on coatings prepared from the coating composition of Example 8 has also been characterized. The technique in this instance was to take a 2 cm×2 cm×2 cm sample of coated block and mount this in epoxy resin filled with white powder to achieve a white background against the black coating. The mounted specimen was then sectioned and polished to reveal the detailed profile of the coating surface. This was photographed at 12X magnification and the outline of the coating surface traced onto plain paper. "Typical" 5 mm sections of this profile were then analyzed in terms of a maximum peak-to-valley height and the average calculated. Values of these measurements are set forth in Table II.

TABLE II

| Coating Roughness for Coating CM-82 | |
|---|---|
| Surface Finish | Average Peak-to-Valley Height Taken on Typical 5 mm Lengths of Coating Surface |
| unfinished | 1.25 mm |
| semi-smoothed | 0.74 mm |
| fully-dry smoothed | 0.62 mm |
| fully-wet smoothed | 0.26 mm |

It was noted that coated cathodes which were given a fully-dry or fully-wet smooth finish exhibited blistering, whereas those given to a semi-smooth finish resulted in acceptable coating. Accordingly, it may be speculated that a surface texture having average peak-to-valley heights of less than about 0.65 mm is to be avoided.

The high porosity of graphite particles (UCAR ® BB-6) or other equivalent porous aggregate enhanced the escape of solvent and other gases during the cure and carbonization cycle, compared to that of regular coke material such as UCAR ® 6-03 coke. Addition of a porous aggregate to the coating reduced the tendency to fonm blisters and the amount of coating shrinkage during curing. Excessive shrinkage weakens the coating-substrate bond strength and enhances crack formation.

EXAMPLE 1: Char Yield

Accurately known weights of mix liquid and solid components of various carbon systems were mixed in a Teflon ® coated mold having dimensions 5.1 cm×1.27 cm×0.63 cm deep. When the system comprised a separate hardener, the weight of hardener was included with the mix liquid weight. Each carbon system was taken through the usual cure cycle, then weighed and removed from the mold. The cured piece was then heated to constant weight in an alumina crucible at 250° C. in air, and the weight corrected for any loss which might have occurred in removing the piece from the mold (e.g., breakage, dusting or adhesion to the mold). The extrapolated weight was thus the "true" weight that the sample would have attained at 250° C. in the absence of physical manipulation. The piece was then sintered to 1000° C. over a period of 24 hours in an alumina crucible under an Argon atmosphere. After furnace cooling, the sample was weighed, and the weight again corrected to correspond with the original weight of composition (rather than the weight used in the sintering phase). The adjusted char weight thus represents the total char weight resulting from the original sample.

An accurately dete-mined weight of the original solids was extracted with boiling methy ethyl ketone (MEK) in a soxhlet extraction apparatus for 4 hours, or longer if the extract continued to emerge colored after that time. The weight of extracted raterial was detenmined by evaporating the pregnant solvent to drYness (at least 24 hours) in a tall glass beaker held in a vacuum oven at ambient temperature. The weight increase over that of the empty beaker was taken as the weight of extracted material. This was cross-checked with the weight of insoluble solids remaining in the soxhlet extraction thimble (similarly evaporated to dryness and constant weight under vacuum).

The weight of MEK insolubles in the original carbon system is then computed from the known weight of solids originally present and the percentage of those solids which comprise the MEK insolubles.

These solids were assumed not to undergo any weight loss to 250° C. Thus, the weight of "resin" (in this case defined as everything apart from MEK insolubles in the carbon system cured to 250° C.) in the piece at 250° C. is given by the "true" piece weight at 250° C. less the weight of MEK insolubles originally present.

The char weight due to the MEK insolubles was determined by sintering the extraction residue from the soxhlet thimble to 1000° C. under an Argon atmosphere in an alumina crucible. The resultant char weight was again adjusted to correspond with the actual weight by subtracting MEK insolubles found in the sample initially.

The char weight from the resin was thus the total char weight minus the char weight from MEK insolubles. And the "char yield" was the char weight from the resin as a percentage of the total resin weight in the slug at 250° C.

Results from these measurements are as follows:

TABLE III

| Carbon System | Char Yield of Resin | Coating Quality |
|---|---|---|
| UCAR ® C-34 cement | 71% | Excellent-high density |
| Atlas CARBO-VITROPLAST | 8% | Poor-brittle, porous, spongy |
| Stebbins AR-20-C Cement | 59% | Good-high density |
| Coating composition CM-82 (Example 8) | 94% | Excellent-high density |

EXAMPLE 2 Expansion Values

A sample of a coating composition was prepared and spread in a Teflon ® coated mold having dimensions 5.1 cm×1.25 cm×0.63 cm deep. This was taken through the usual cure cycle, allowed to cool, and the sample removed from the mold. The sample was cut into four test pieces of dimensions 2.5 cm×0.6 cm×0.6 cm which were dried to constant weight in an alumina crucible at 250° C. (usually 16-24 hours).

A test-piece was measured using a micrometer, then heated from room temperature to 1000° C. in a dilatoaeter which was continuously flushed with Argon. The dilation/contraction was recorded continuously as a function of temperature on an XY recorder. Two shrinkage values were calculated: one based on the original sample length together with the length at 1000° C.; the other based on the original length together with the final length once the sample had cooled back to room temperature. Final lengths of the samples were also measured with a micrometer after cooling as a double check on the recording system. The samples tested were as set forth in Table IV.

While the overall expansion of the coating materials appears to show relatively poor reproducibility, in spite of very careful sample preparation and uniform temperature cycling, it is noted that after carbonization, expansion of the coating material between 800° C. and 1000° C. shows good reproducibility, and is very similar to block expansion. It is further noted that the UCAR ® C-34 cement by itself displays an unacceptable expansion over this temperature range.

It is believed that up to the point of full carbonization (about 800° C.), the coating has sufficient yield to accomodate any mismatch in C.T.E. between coating and cathode substrate. Beyond this point the coating becomes rigid and brittle, so that if a difference in C.T.E. exists, it may only be accomodated by development of internal stresses, or by opening up of larger cracks.

TABLE IV

| | | Expansion Values | | |
|---|---|---|---|---|
| Material | | Overall Expansion 20° C.-1000° C. | Expansion* 800° C.-1000° C. | Overall Contraction** 20° C.-1000° C.-20° C. |
| Cathode Block | | | | |
| Sumitomo S.K. | | 0.49% | 0.12% | 0 |
| UCAR ® CFN | | 0.33% | 0.08% | 0 |
| Stein | | 0.48% | 0.12% | 0 |
| Savoie HC-10 | | 0.36% | 0.08% | 0 |
| CM-78B | #1 | 0.12% | 0.15% | −0.52% |
| | #2 | 0.01% | 0.11% | −0.52% |
| CM-82 | #1 | 0.32% | 0.08% | −0.79% |
| | #2 | 0.13% | 0.10% | −0.63% |
| UCAR ® C-34 Cement (No additive, no fiber) | | 1.8% | −0.14% | −2.3% |

*Curves from the dilatometer show that carbonization is complete at about 800° C. Therefore the expansion between 800° C. and 1000° C. represents the expansion of a coating which has lost essentially all its plasticity.
**The overall contraction is based on the original length of the sample, and the final length once it has been through the temperature cycle and returned to room temperature.

EXAMPLE 3

A coating composition (CM-24A) was made by combining and mixing the following components (percentages are by weight): 36 percent $TiB_2$, −325 mesh; 34.2 percent Union Carbide UCAR ® C-34 carbon cement solids, 19.7 percent UCAR ® C-34 mix liquid; 10.1 percent Union Carbide calcined petroleum coke particles, grade 6-03.

The resulting coating composition was applied to a 7.5 cm×15 cm cathode block substrate. Enough material to make a layer approximately 0.16 cm deep was applied and worked into the block surface. Additional material to make a layer approximately 1.59 cm thick was added, smoothed and levelled.

The coating was cured by heating at 25° C./hour to 100° C., holding 5 hours, heating at 25° C./hour to 140° C., holding 24 hours, and air cooling to room temperature.

After curing, several small cracks were evident but the coating-to-substrate bond was intact.

EXAMPLE 4

A coating composition (CM-37) was made by combining and mixing the following components: 36 percent $TiB_2$, −325 mesh; 29.4 percent UCAR ® C-34 cement solids; 32.4 percent UCAR ® C-34 mix liquid; 2.2 percent Great Lakes Carbon FORTAFIL ® 0.63 cm length unsized fiber.

The resulting coating composition was applied to a 7.5 cm×15 cm cathode block substrate and cured in a manner similar to that described in Example 3.

After curing, the coating exhibited no cracks such as were evident in the coating with the carbon aggregate used in Example 3. The carbon fibers appear to act as crack arrestors in the cathode coating, and so should result in a longer cathode life.

EXAMPLE 5

A 7.5 cm×15 cm piece of cathode block was utilized as a substrate for a coating composition(CM-38A) consisting of 37.5 percent $TiB_2$, 30.6 percent UCAR® C-34 cement solids, 29.6 percent UCAR® C-34 mix liquid, and 2.3 percent FORTAFIL® unsized carbon fiber. This material was applied in a manner similar to that of Example 3, to a final thickness of 0.95 cm.

The coated substrate was then cured in accordance with the following cycle: The coated block was heated to 100° C. at a rate of 25° C. per hour, and held at this temperature for 3 hours. Heating was continued at 25° C. per hour to 140° C., at which temperature the block was held for 16 hours. The coated block was then removed and allowed to air cool to room temperature. No surface blisters, cracks, or bond defects were visible upon inspection.

The cured block was then carbonized by heating to 1000° C. over a 24 hour period, in an argon atmosphere to avoid oxidation. The block was then permitted to cool to below 200° C. under an Argon atmosphere, removed and cooled to room temperature. After cooling, examination revealed no defects. Integrity and substrate bond remained unaffected by carbonization.

EXAMPLE 6

The mix liquid content was reduced from about 20–32 weight percent to about 15–19 weight percent, in order to scale up the coating process for coating small test blocks (7.5 cm×15 cm) to that for full-scale cathode blocks (50.2 cm×52.1 cm). Blisters formed during the cure cycle when higher solvent formulations were used to coat the larger cathode blocks. As the surface area to circumference ratio for the block to be coated increased, there was an increasing tendency for the coating to form blisters, i.e., the solvent could not escape during the cure cycle. Blistering also tended to increase with coating thickness, i.e., 0.32 cm thick coatings had little tendency to blister whereas 1.27 cm thick coatings had a large tendency to blister. Blister-free coatings were obtained on cathode blocks using the following formulation (CM-66):

36 weight percent $TiB_2$ powder, −325 mesh
  36.35 weight percent UCAR® C-34 cement solids
  19.3 weight percent UCAR® C-34 mix liquid
  0.35 weight percent Great Lakes Carbon FORTAFIL® 3, unsized carbon fibers, 0.63 cm length
  8.0 weight percent UCAR® BB-6 Graphite particles A commercial VSS aluminum reduction cell was operated experimentally for 310 days using a cathode coated 0.63 cm thick with the above formulation. The cell energy efficiency was 0.14 kwh per pound of aluminum produced lower than the plant average for the last nine months of operation.

After 310 days of operation, the test cell (A-43) was shut down and the molten metal and bath tapped so that less than 5 cm of metal remained in the bottom of the cathode cavity. Examination of a 4.5 cm diameter core sample from the cold test cathode revealed that the coating loss was consistent with the projected coating life as determined from metal analysis (i.e., approximately ⅓ of the original coating thickness had been lost). In isolated areas of the cathode, there was evidence that the entire coating had been lost.

Core samples from test cell A-46 in Table V, which was also shut down, confirmed that the coating loss was consistent with the projected coating life as determined from metal analysis. There was no evidence of isolated areas of coating failure or muck formation on the cathode surface of this cell.

EXAMPLE 7

The tendency to form blisters was reduced by decreasing the fiber content in the coating, because reducing the fiber content decreased the amount of solvent required to make the coating workable. However, there was a tendency for the formation of fine vertical cracks in the coating. These fine vertical cracks provided a means for the solvent to escape during the cure cycle, and hence, reduced blistering. Blister-free, but finely cracked, coatings were obtained on cathode blocks using the following formulation (CM-78B):

46.0 weight percent $TiB_2$ powder, −325 mesh
  28.5 weight percent UCAR® C-34 cement solids
  15.5 weight percent UCAR® C-34 mix liquid
  10.0 weight percent UCAR® BB-6 Graphite particles Many problems were encountered during the initial stage of this coating experiment due to an attempt to create a veCY smooth coating surface. After application of the coating composition to the cathode substrate, it was wet with excess mix liquid and completely smoothed. Such smooth coatings developed severe blisters upon curing. The extra mix liquid apparently formed a "skin" on the surface during cure, and interfered with the escape of evolved gases. This resulted in blister formation and defective coatings. When the surfaces of subsequent coatings were given a light surface finish without excess liquid, no blister formation occurred, and acceptable cured surfaces resulted. It was also noted that ambient temperatures had an effect upon the mixing and spreadability of the coating composition, with colder temperatures resulting in a stiffer, more difficult coating application.

As long as vertical cracks remain small, they do not interfere with the function of the coating. The $TiB_2$ content was increased in this formulation to increase the coating life, based on an assured constant $TiB_2$ dissolution rate. A commercial VSS aluminum reduction cell was operated experimentally for more than 225 days using a cathode coated 0.95 cm thick with the above formulation. The cell energy efficiency was 0.19 kwh per pound of aluminum produced lower than the plant average, for the last six months of operation.

EXAMPLE 8

The formulatfon of Example 7 was modified to reduce the number of vertical cracks in the coating while still maintaining a low solvent content to prevent the formulation of blisters. Preferred formulations (CM-82 and CM-82A), the cured resinous binder of which has a char yield of 94 percent, as determined by char yield analysis of this coating, follow:

CM-82

46.0 weight percent $TiB_2$ powder, Carborundum −325 mesh 28.0 weight percent UCAR® C-34 cement solids
15.8 weight percent UCAR® C-34 mix liquid
0.2 weight percent Great Lakes Carbon FORTAFIL® 3, carbon fibers sized for UCAR® C-34 cement, 0.32 cm length
10.0 weight percent UCAR® BB-6 Graphite particles.

CM-82S 46.0 weight percent TiB₂ powder, Metallurg −325 mesh
28.0 weight percent UCAR® C-34 cement solids
15.8 weight percent UCAR® C-34 mix liquid
0.2 weight percent Great Lakes Carbon FORTAFIL® 3, carbon fibers sized for UCAR® C-34 cement, 0.32 cm length
10.0 weight percent UCAR® BB-6 Graphite particles.

Cathode blocks for two commercial size VSS aluminum reduction test cells were successfully coated to a thickness of 0.95 cm with the above formulations and operated for 125 days. The number of vertical cracks in the coatings was reduced to virtually zero. The cell energy efficiencies were 0.08 and 0.05 kwh per pound of aluminum produced lower than the plant average respectively, for the last two months of operation.

In preparing the coated cathode blocks of this Example, the blocks were preheated to 40° to 50° C. prior to coating, due to cooler ambient temperature, to give good coating composition workability without the need to add additional mix liquid. It was also noted that preheating the dry and liquid components of the coating composition prior to mixing improved the blending and application properties of the coating composition. Further, at lower mix liquid concentrations, less blister formation occurred.

Additional experiments were conducted utilizing various coating compositions and preheating the cathode blocks. It was found that preheating the block to 70° to 80° C. resulted in a very smooth and easy coating application, but caused premature curing, resulting in excessive shrinkage and debonding. It was found that pre-heating temperatures of 40°–50° C. resulted in the best combination of coating composition workability and elimination of shrinkage effects.

The foregoing coating formulations, and additional formulations prepared and utilized for commercial VSS aluminum cell cathode blocks are summarized in the following Table V, wherein energy efficiency is expressed as kwh per pound of aluminum produced, and projected coating life is based upon dissolution of TiB₂ into the aluminum product. At an energy cost of 22 mils per kwh, savings on the order of $10 per ton are projected.

TABLE V

Experimental Results

| Composition (Weight Percent) | CM-66 | CM-78B | CM-84A | CM-78B | CM-82 | CM-82S |
|---|---|---|---|---|---|---|
| Cell | A-43 | D-29 | D-60 | D-37 | A-50 | A-46 |
| Example | Example 6 | Example 7 | | | Example 8 | Example 8 |
| TiB₂ | 36.0 | 46.0 | 36.0 | 46.0 | 46.0 | 46.0 |
| UCAR® cement solids | 36.35 | 28.5 | 37.65 | 28.5 | 28.0 | 28.0 |
| UCAR® mix liquid | 19.3 | 15.5 | 18.0 | 15.5 | 15.8 | 15.8 |
| Aggregate | 8.0 | 10.0 | 8.0 | 10.0 | 10.0 | 10.0 |
| Carbon fiber | 0.35 | — | 0.35 | — | 0.20 | 0.20 |
| Days in Service | 310 | 225 | 181 | 168 | 125 | 109 |
| Coating Thickness | 0.63 cm | 0.95 cm | 0.95 cm | 0.95 cm | 0.95 cm | 0.95 cm |
| Projected life (days) | 875 | 2000 | 2000 | 2000 | 2000 | 2000 |
| Energy Saving (kwh/#) | 0.14 | 0.19 | 0.22 | 0.39 | 0.08 | 0.05 |
| TiB₂ specification (−325 mesh) | Carborundum 99.5 percent | Carborundum 99.5 percent | Carborundum 99.5 percent | Carborundum 99.5 percent | Carborundum 99.5 percent | Metallurg 98 percent |
| Fiber specification (Great Lakes Carbon FORTAFIL® 3) | 0.63 cm unsized | | 0.32 cm sized | | 0.32 cm sized | 0.32 cm sized |

In addition to the commercially available carbon cement UCAR® C-34, utilized in foregoing examples, a large number of other thermosetting carbon cements have been utilized for the preparation of coating compositions. In most cases, successful coatings were prepared. In most instances where poor quality coatings resulted after curing and carbonization, it is believed that successful coatings may be prepared by making specific modifications to the coating formulation.

EXAMPLE 9

A coating composition (CM-89) was prepared by combining and mixing the following components: 36.5 percent TiB₂, 34.6 percent UCAR® C-37 carbon cement solids, 19.2 percent UCAR® C-37 mix liquid, and 9.7 percent UCAR® BB-6 graphite aggregate. This composition is essentially identical to the composition of UCAR® C-34 carbon cement, with the addition of acid washed graphite flake carbonaceous filler for expansion. The coating composition was relatively workable, and fluid, and was easily spread with little tool sticking upon a Sumitomo SK cathode block, 7.5 cm × 15 cm × 5 cm, to a thickness of 0.95 cm.

This coated block was cured by elevating the temperature from room temperature to 100° C. in a 1-hour period. Holding 4 hours, heating to 135° C. in 1 hour, holding at 135° C. for 4 hours, heating to 150° C. in 1 hour, holding at 150° C. for 12 hours, heating to 165° C. in 1 hour, and holding for 3 hours at 165° C., followed by cooling in air. The cured coating exhibited debonding due to shrinkage at the outside edges of the substrate surface, with minor internal porosity, very minor lateral cracks, and no surface defects.

The coated substrate was then carbonized by heating to 1000° C. in an argon atmosphere over a 24-hour period, and allowed to cool to room temperature. The coating was essentially destroyed by the carbonization, with virtually no coating remaining on the substrate surface. This example is illustrative of the importance of choice of the carbonaceous additive utilized in the coating composition. In this specific instance, the coating composition included an incompatible additive in the carbon cement resin, specifically a graphite flake additive suitable for causing expansion.

EXAMPLE 10

A coating composition (CM-90) was prepared from a mixture of 35 percent TiB$_2$, −325 mesh, 33.4 percent UCAR® C-38 carbon cement solids, 22.2 percent UCAR® C-38 mix liquid, and 9.4 percent UCAR® BB-6 graphite particles. The UCAR® C-38 cement is believed to be essentially identical to the UCAR® C-34 carbon cement with the addition of an oxidation inhibitor. The coating composition prepared exhibited good workability, fluidity, and was easily spread onto a Sumitomo SK block as set forth in the previous example. This coated block was then cured, as in Example 9. The cured coating composition illustrated very large sub-surface blisters, bood bonding, good density, and no surface defects.

After carbonization as set forth in Example 9, the carbonized coating exhibited debonding due to shrinkage of the coating composition, with no surface defects appearing in the carbonized coating. It is believed that this coating composition could well be utilized in the present invention by providing a bonding layer of carbon cement between the coating composition and the cathode substrate.

EXAMPLE 11

A coating composition (CM-87) consisting of 33.6 percent TiB$_2$, 37.5 percent Stebbins AR-20-C carbon cement solids, and 28.9 percent Stebbins AR-20-QC mix liquid was prepared. The Stebbins AR-20-QC mix liquid is believed to comprise a partially polymerized furane resin, such as a furfuryl alcohol low resin polymer. Furfural and a latent catalyst, such as phthalic anhydride, are also believed to be present. The cement solids of this carbon cement are believed to comprise a carbon powder with catalyst, and an aniline modifier.

This coating composition was applied to a cathode substrate, as previously set forth, and cured at 30° C. for 24 hours, heated to 110° C. in 3 hours, and held for 24 hours at 110° C. The coating composition, which exhibited poor workability, and was stiff and sticky prior to application to the substrate, exhibited very minor lateral cracking after curing. The cured coating was hard with no blisters or large cracks, had good density, and a very strong bond to the substrate. After carbonization as set forth in Example 9, the carbonized coating exhibited slight shrinkage cracking, slight debonding due to said shrinkage, good density, but had large spalled areas.

EXAMPLE 12

A similar coating composition (CM-88) was prepared utilizing 38.7 percent Stebbins AR-25-HT carbon cement solids, 28.3 percent Stebbins AR-25-HT mix liquid, and 33 percent titanium diboride. This cement is believed to comprise a modified furane resin, of furfuryl alcohol and a low resin polymer of furfuryl alcohol and a latent catalyst. The coating composition was stiff and sticky, exhibiting poor workability. The coated substrate was cured as set forth in Example 11, resulting in a coated substrate exhibiting the same characteristics as those of the coating of Example 11. After carbonization, the coating exhibited more shrinkage than that of Example 11, causing debonding. No spalling or cracks were noted in the surface layer, however.

EXAMPLE 13

A polyester resin with carbon filler, marketed as Atlas CARBO-VITROPLAST carbon cement, was mixed with 35 percent TiB$_2$ to form a coating composition (CM-92). The coating composition exhibited good workability, good fluidity, was not sticky, and was easily spread upon a cathode substrate as set forth in Example 9.

The coated substrate was cured by heating to 100° C. in 1 hour, holding at 100° C. for 3 hours, heating to 165° C. in 1 hour, holding at 165° C. for 10 hours, heating to 200° C. in 1 hour, holding for ½ hours, and air cooling. The cured coated exhibited excellent bonding to the substrate, excellent density, and no surface defects. The coated substrate was then subjected to carbonization, as set forth in Example 9. The carbonized coated exhibited complete debonding, with the coating complete but having extensive fine porosity. The coating displayed no surface defects, but was very light and powdered easily. It is noted that the resinous binder utilized in the preparation of this coating composition exhibited a char yield of only 8 percent, illustrating the criticality of this parameter.

EXAMPLE 14

Atlas CARBO-ALKOR, a carbon cement based upon furane resin with carbon filler, was prepared in accordance with manufacturer's instructions and blended with sufficient titanium diboride to comprise 35 percent of the coating composition. This coating composition (CM-93) exhibited very good workability. After curing as set forth in Example 13, the coating exhibited good bonding through the substrate, extensive surface spalling, and reasonable density. After carbonization, the coating exhibited slight debonding, more extensive spalling, and large cracks in the surface due to shrinkage. When the coating composition was reformulated by the substitution of 3.5 percent soap as gas release agent in place of an equal amount of mix liquid, an acceptable coating was obtained.

EXAMPLE 15

A coating composition (CM-94) was prepared as set forth in Example 13, utilizing Atlas CARBO-KOREZ carbon cement, which is believed to be a phenolic resin based cement with carbon filler, having a butyl alcohol solvent. The coating composition exhibited very poor workability, being extremely stiff and hard to spread on the carbon substrate. After curing as set forth in Example 13, the coating composition exhibited good bonding, good density and no surface defects. After carbonization, however, debonding due to shrinkage was observed. It is believed that the substitution of a furfuryl alcohol solvent for the butyl alcohol mix liquid of the Atlas CARBO-KOREZ resin would result in improved impregnation of the cathode substrate, and hence better bonding.

EXAMPLE 16

A coating composition was prepared utilizing 35 percent TiB$_2$ and 65 percent premixed DYLON grade GC carbon cement. The DYLON carbon cement is believed to comprise less than 10 percent powdered coal tar pitch, less than 20 percent phenolic resin, and less than 35 percent furfuryl alcohol. The coating composition exhibited very. good workability, but after curing as set forth in Example 9, extensive large cracking of the coating and debonding were observed. Substantial lateral cracking and high porosity were noted. This coating was not considered worth carbonization in light of its poor condition after curing. This coating composition was later reformulated with the addition of 3.5 percent soap as a gas release agent, and produced an excellent coating after cure and carbonization. This illustrates the criticality of choice of additional materials for the coating composition, and the failure of a coating composition due to lack of porosity by which volatiles could escape.

EXAMPLE 17

A coating composition was prepared utilizing 45 percent $TiB_2$ and 55 percent pre-mixed Aremco GRAPHI-BOND TM Grade 551-R carbon cement. This carbon cement is believed to comprise 60 percent graphite, and 40 percent furfuryl alcohol, and is specifically formulated for use in reducing atmospheres. The coating composition was smooth and relatively easy to apply to the cathode substrate. The coating substrate was then cured as set forth in Example 9, resulting in good bonding, reasonable density, with vertical cracking near the edges and extensive fine horizontal cracking. After carbonization, debonding occurred near the edges due to shrinkage, but the coating exhibited reasonable density, with some large vertical cracking and some fine horizontal cracking. It is believed that the addition of gas release agent and carbonaceous additive would overcome such problems.

EXAMPLE 18

A coating composition as set in Example 17 was prepared, utilizing Aremco GRAPHI-BOND TM Grade 551-A, which is believed to comprise 32 percent graphite, and 68 percent alumino-sodium silicate. The coating composition was very fluid, and poured rather than spread. The coated substrate was cured as in Example 9, but a huge blister developed within the coating after 4 hours at 100° C. A good bond was formed, although the coating was extremely porous. After carbonization, the coating appeared visably unchanged, but it had become more brittle and crumbly, and slight debonding was evident near the edges. This example illustrates a coating composition which is unsuitable in the present invention.

EXAMPLE 19

An additional coating composition was prepared utilizing 45 percent $TiB_2$ and premixed Great Lakes Carbon Grade P-514 carbon cement, believed to be based upon graphite particles and a binder. The coating composition was easily workable, and easily smoothed on to a cathode substrate. After curing, as set forth in Example 9, extensive large scale porosity and spalling occurred after 4 hours at 100° C. A good bond was formed, with good density in regions between holes. The coating was shiny, with a glassy appearance within pores and under the spalled areas. After carbonization, the coated substrate appeared unchanged, except that large vertical cracks had developed and slight debonding occurred along the edges. When the coating composition was reformulated by the substitution of 3.5 percent soap as gas release agent in place of an equal amount of mix liquid, an acceptable coating was obtained.

EXAMPLE 20

An intractable (infusible) polyphenylene polymer is prepared by polymerization of 1,3- cyclohexadiene with Ziegler-Natta catalysts followed by halogenation and dehydrohalogenation. This produces a para-phenylene polymer with a molecular weight of about 4,000. This resin alone is unsuitable for use in the present invention because of the relatively low molecular weight and relative insolubility.

A fusible polyphenylene resin (soluble, for example, in trichlorobenzene) is prepared by cationic oxidative polymerization of 1,3,5-triphenylbenzene. The reaction product contains intractable polyphenylene by-product which is removed by fractional distillation. The distilled fusible polyphenylene has a molecular weight between 1000 and 1500.

A coating composition is prepared utilizing these two resins, as follows. The two resins are ground separately to −325 mesh and then mixed thoroughly for 15 minutes in a high speed blender, in the ratio 1.6 percent (by weight of the coating composition) intractable polyphenylene to 3.3 percent fusible polyphenylene. To this mixture is then added 16.3 percent graphite flour (UCAR ® GP 38 P) and 8.2 percent REGAL ® 400 pellets (carbon black from Cabot Corporation).

A mix liquid is prepared containing 1.6 percent of triethanol amine (TEA) oleate and 11.4 percent of chloroform. The TEA oleate is first heated to a liquid state by warming to 100° C. and then pouring into the chloroform.

To the dry components (comprising the polyphenylene resin powders, graphite powder and carbon black) are now added 47.3 percent Carborundum −325 $TiB_2$, 9.8 percent Union Carbide UCAR ® BB-6 graphite aggregate and 0.5 percent Great Lakes Carbon FORTAFIL ® 0.32 cm sized fiber. The ingredients are dry blended and the mix liquid added until a uniform dispersion of the ingredients is observed.

The coating composition is spread onto a cathode block in the usual manner to form a 0.95 cm thick layer. This block is then left in air for 1 hour to allow some of the solvent to evaporate. Curing is achieved by slowly heating the coated block to 70° C. to volatilize most of the mix liquid, followed by slow heat to 80° C. and holding at this temperature for 2 hours. Again the temperature is slowly raised to 200° C. and held for 8 hours. The block is then cooled to room temperature.

A partial carbonization is then effected by heating for 9 hours at 135° C., followed by 24 hours of slow temperature elevation to 300° C. and holding at 300° C. for 6 hours. A satisfactory coating results.

EXAMPLE 21

A coating composition (CM-91) consisting of 44.9 percent $TiB_2$ (−325 mesh, Carborundum), 28 percent UCAR ® C-34 carbon cement solids, 14.7 percent UCAR ® C-34 mix liquid, 12 percent UCAR ® BB-6 graphite, and 0.4 percent Great Lakes Carbon FORTAFIL ® 3 0.32 cm sized fiber was prepared.

This composition was difficult to mix due to high fiber content. $TiB_2$ dispersion was poor, and the composition needed remixing half way through the coating operation.

This material was coated on a full size cathode block, preheated overnight to 50° C. The composition was difficult to spread until heated by the warm block.

The coating was levelled to a 1.27 cm thickness, semi-smoothed, and cured in the manner set forth in Example 9. No defects were noted after cooling.

The coating was then carbonized yielding a satisfactorily bonded coating with an acceptable surface.

It is understood that the above description of the present invention is susceptible to various modifications, changes and adaptations by those skilled in the art, and the same are intended to be considered within the scope of the present invention, which is set forth by the appended claims.

What is claimed is:

1. A coating composition for aluminum cell cathode surfaces, comprising from about 35 to about 60 percent titanium diboride, from about 15 to about 55 percent of a non-graphitizing thermosetting resinous binder system characterized by a char yield greater than 50 percent, from about 10 to about 40 percent carbonaceous filler having a particle size less than 100 mesh, from about 5 to about 15 percent carbonaceous additive having a particle size between about $-8$ mesh and $+20$ mesh, from about 0.05 to about 0.5 percent carbon fiber, less than about 5 percent gas release agent, and an effective amount of curing agent for said resinous binder system.

2. A coating composition as set forth in claim 1, wherein said coating composition is further characterized by an expansion of less than 0.2 percent between 800° C. and 1000° C., and an overall contraction of less than 1.0 percent when cycled from 20° C. to 1000° C. to 20° C.

3. A coating composition as set forth in claim 2, wherein said coating composition exhibits an expansion between 800° C. and 1000° C. which differs from the expansion of the cathode block to which it is applied by less than 0.1 percent over said temperature range.

4. A coating composition as set forth in Claim 3, wherein said titanium diboride comprises single crystal titanium diboride.

5. A coating composition comprising from about 10 to about 90 percent Refractory Hard Material, from about 3 to about 80 percent non-graphitizing thermosetting resinous binder system, from about 1 to about 60 percent carbonaceous filler having a particle size less than 100 mesh, and up to about 70 percent carbonaceous additive having a particle size between about $-4$ mesh and $+100$ mesh, wherein said thermosetting binder system exhibits a char yield greater than 25 percent, and said binder system, carbonaceous filler, and carbonaceous additive exhibit an ablation rate after curing and carbonization essentially equal to the combined rate of wear and dissolution of said Refractory Hard Material in the environment of an aluminum reduction cell.

6. A coating composition as set forth in claim 5, wherein said Refractory Hard Material is selected from the group consisting of titanium diboride, titanium carbide, zirconium diboride, zirconium carbide, and alloys thereof.

7. A coating composition as set forth in claim 6, wherein said Refractory Hard Material is titanium diboride.

8. A coating composition as set forth in claim 7, wherein said titanium diboride comprises from about 20 to about 70 percent of the composition.

9. A coating composition as set forth in claim 7, wherein said titanium diboride comprises from about 35 to about 60 percent of the composition.

10. A coating composition as set forth in claim 5, wherein said coating composition exhibits a percentage of expansion over the temperature range of from about 800° C. to 1000° C. which differs from the percentage of expansion of the substrate to which said coating composition is applied, over said temperature range, by less than 0.2.

11. A coating composition as set forth in claim 5, wherein said binder system comprises a resinous binder selected from the group consisting of phenolic, polyphenylene, heterocyclic, silicone, and alkyd resins, and mixtures thereof, and a mix liquid.

12. A coating composition as set forth in claim 11, wherein said Refractory Hard Material is selected from the group consisting of titanium diboride, titanium carbide, zirconium diboride, zirconium carbide, and alloys thereof.

13. A coating composition as set forth in claim 12, wherein said Refractory Hard Material comprises titanium diboride.

14. A coating composition as set forth in claim 12, wherein said Refractory Hard Material is selected from the group consisting of single crystal, bicrystal, and open clusters of single crystal Refractory Hard Material.

15. A coating composition as set forth in claim 14, wherein said Refractory Hard Material is titanium diboride.

16. An uncured coating composition comprising from about 10 to about 90 percent Refractory Hard Material, from about 1 to about 50 percent non-graphitizing thermosetting resinous binder, from about 2 to about 40 percent mix liquid, from about 1 to about 60 percent carbonaceous filler having a particle size less than 100 mesh, and up to about 70 percent carbonaceous additive having a particle size between about $-4$ mesh and $+100$ mesh.

17. A coating composition as set forth in claim 16, wherein said resinous binder is selected from the group consisting of phenolic, polyphenylene, heterocyclic, silicone, and alkyd resins, and mixtures thereof.

18. A coating composition as set forth in claim 16, wherein said resinous binder and mix liquid have a char yield greater than about 50 percent.

19. A coating composition as set forth in claim 18, wherein said resinous binder, mix liquid, carbonaceous filler, and carbonaceous additive have an ablation rate, after curing carbonization, essentially equal to the combined rate of wear and dissolution of said Refractory Hard Material in an aluminum cell environment.

20. A coating composition as set forth in claim 19, which exhibits a percentage of expansion between 800° C. and 1000° C. within 0.2 of the percentage of expansion between 800° C. and 1000° C. of the substrate to which said coating composition is applied.

21. A coating composition as set forth in claim 19, which exhibits an expansion of less than 0.2 percent between 800° C. and 1000° C., and an overall contraction of less than 1.0 percent upon cycling from 20° C. to 1000° C. to 20° C.

22. A coating composition as set forth in claim 16, wherein said Refractory Hard Material is selected from the group consisting of single crystal, bicrystal, and open clusters of single crystal Refractory Hard Material.

23. A coating composition as set forth in claim 22, wherein said Refractory Hard Material is selected from the group consisting of titanium diboride, titanium carbide, zirconium diboride, zirconium carbide and alloys thereof.

24. A coating composition as set forth in claim 22, wherein said Refractory Hard Material is titanium diboride.

25. A coating composition as set forth in claim 24, wherein said resinous binder is a phenolic resin.

26. A coating composition as set forth in claim 24, wherein said titanium diboride comprises from about 10 to about 90 percent by weight of the composition, said resinous binder comprises from about 1 to about 40 percent, said mix liquid comprises from about 2 to about 40 percent, said carbonaceous filler comprises from about 1 to about 60 percent, and said carbonaceous additive comprises up to about 70 percent.

27. A coating composition as set forth in claim 26, wherein said carbonaceous filler has a C:H ratio greater than 2:1.

28. A coating composition as set forth in claim 26, wherein said carbonaceous additive includes carbon fiber.

29. A coating composition as set forth in claim 28, wherein said carbonaceous additive comprises from about 5 to about 15 percent of the coating composition.

30. A coating composition as set forth in claim 29, wherein said carbon fiber comprises from about 0.05 percent to about 1.0 percent of the coating composition, and is sized.

31. A composition for coating aluminum cell cathode surfaces, which composition comprises from about 20 to about 70 percent by weight Refractory Hard Material, from about 1 to about 40 percent non-graphitizing thermosetting resinous binder, from about 5 to about 25 percent mix liquid, from about 10 to about 40 percent carbonaceous filler having a particle size less than about 325 mesh, from about 5 to about 15 percent carbonaceous additive having a particle size between about −8 mesh and +20 mesh, from about 0.05 to about 0.5 percent carbon fiber, and effective amounts of gas release agent and curing agent, wherein aaid resinous binder and mix liquid exhibit a char yield greater than about 50 percent.

* * * * *

Disclaimer 4,526,911.—*Larry G. Boxall, William M. Buchta* and *Arthur V. Cooke,* Baltimore, *Dennis C. Nagle,* Catonsville, and *Douglas W. Townsend,* Glen Burnie, Md. ALUMINUM CELL CATHODE COATING COMPOSITION. Patent dated July 2, 1985. Disclaimer filed June 10, 1986, by the assignee, *Commonwealth Aluminum Corp.*

Hereby disclaims the term of this patent subsequent to Aug. 20, 2001.
[*Official Gazette August 5, 1986.*]